(12) United States Patent
Micci et al.

(10) Patent No.: US 11,249,575 B2
(45) Date of Patent: Feb. 15, 2022

(54) FORCE SIGNAL PROCESSING

(71) Applicant: Cambridge Touch Technologies Ltd., Cambridge (GB)

(72) Inventors: Riccardo Micci, Cambridge (GB); Arokia Nathan, Cambridge (GB)

(73) Assignee: Cambridge Touch Technologies Ltd., Cambridge (GB)

( * ) Notice: Subject to any disclaimer, the term of this patent is extended or adjusted under 35 U.S.C. 154(b) by 0 days.

(21) Appl. No.: 16/909,248

(22) Filed: Jun. 23, 2020

(65) Prior Publication Data

US 2021/0011574 A1    Jan. 14, 2021

(30) Foreign Application Priority Data

Jul. 9, 2019    (GB) ..................................... 1909827

(51) Int. Cl.
*G06F 3/041*    (2006.01)
*G06F 3/044*    (2006.01)

(52) U.S. Cl.
CPC .......... *G06F 3/0414* (2013.01); *G06F 3/0418* (2013.01); *G06F 3/044* (2013.01)

(58) Field of Classification Search
CPC ............... G06F 3/0414; G06F 3/04144; G06F 3/04166; G06F 3/0418; G06F 3/04182; G06F 3/044
See application file for complete search history.

(56) References Cited

U.S. PATENT DOCUMENTS

| | | |
|---|---|---|
| 10,108,286 B2 | 10/2018 | Harley |
| 10,254,894 B2 | 4/2019 | Nathan et al. |
| 10,282,046 B2 | 5/2019 | Nathan et al. |
| 10,310,659 B2 | 6/2019 | Nathan et al. |
| 10,318,038 B2 | 6/2019 | Nathan et al. |
| 10,430,009 B2 | 10/2019 | Nathan et al. |
| 10,852,875 B2 | 12/2020 | Routley et al. |

(Continued)

FOREIGN PATENT DOCUMENTS

| | | |
|---|---|---|
| EP | 2902886 A1 | 8/2015 |
| GB | 2570538 A | 7/2019 |

(Continued)

OTHER PUBLICATIONS

International Search Report and Written Opinion, dated Nov. 12, 2020, directed to International application No. PCT/GB2020/051452, 15 pages.

(Continued)

*Primary Examiner* — Hong Zhou

(57) ABSTRACT

A method of processing a number of force values is described. Each force value corresponds to a sensor location. The sensor locations are spaced apart along a direction. The method includes receiving the force values (S11). The method also includes determining whether the force values include one or more candidate peaks (S12). Each candidate peak corresponds to a local maximum of the force values. The method also includes, in response to at least one candidate peak exceeds a minimum force threshold (S13), interpolating the force values and estimating a number of peak coordinates and corresponding peak force values based on the interpolated force values and the candidate peaks (S14) which exceed the minimum force threshold.

15 Claims, 14 Drawing Sheets

(56) References Cited

U.S. PATENT DOCUMENTS

| | | |
|---|---|---|
| 10,928,947 B2 | 2/2021 | Micci et al. |
| 2011/0141053 A1 | 6/2011 | Bulea et al. |
| 2011/0175835 A1* | 7/2011 | Wang .................... G06F 3/0446 345/173 |
| 2012/0098783 A1 | 4/2012 | Badaye et al. |
| 2014/0210791 A1 | 7/2014 | Hanauer et al. |
| 2014/0341446 A1 | 11/2014 | Hare et al. |
| 2014/0354585 A1 | 12/2014 | Cok et al. |
| 2015/0042590 A1 | 2/2015 | Ando et al. |
| 2015/0091859 A1* | 4/2015 | Rosenberg .......... G06F 3/04162 345/174 |
| 2015/0331517 A1 | 11/2015 | Filiz et al. |
| 2017/0199624 A1* | 7/2017 | Nathan ................. G06F 3/0445 |
| 2017/0262099 A1 | 9/2017 | Nathan et al. |
| 2017/0322664 A1 | 11/2017 | Park et al. |
| 2017/0364193 A9 | 12/2017 | Nathan et al. |
| 2017/0371470 A1 | 12/2017 | Nathan et al. |
| 2018/0067604 A1 | 3/2018 | White et al. |
| 2018/0074637 A1* | 3/2018 | Rosenberg .......... G06F 3/04166 |
| 2018/0143728 A1 | 5/2018 | Withers et al. |
| 2018/0307365 A1* | 10/2018 | Chen ...................... G06F 3/045 |
| 2019/0050080 A1* | 2/2019 | Bagheri .............. G06F 3/04166 |
| 2019/0227649 A1 | 7/2019 | Micci et al. |
| 2019/0243503 A1 | 8/2019 | Nathan et al. |
| 2019/0286263 A1 | 9/2019 | Bagheri et al. |
| 2019/0361547 A1 | 11/2019 | Nathan et al. |
| 2019/0377452 A1 | 12/2019 | Routley et al. |
| 2019/0377468 A1 | 12/2019 | Micci et al. |
| 2019/0377469 A1 | 12/2019 | Routley et al. |
| 2021/0055832 A1 | 2/2021 | Bagheri |
| 2021/0141507 A1 | 5/2021 | Micci et al. |

FOREIGN PATENT DOCUMENTS

| | | |
|---|---|---|
| JP | 2010026938 A | 2/2010 |
| JP | 2015097068 A | 5/2015 |
| WO | 2016102975 A2 | 6/2016 |
| WO | 2017109455 A1 | 6/2017 |
| WO | 2019030513 A1 | 2/2019 |

OTHER PUBLICATIONS

Combined Search and Examination Report under Sections 17 and 18(3) for UK application No. GB1909827.6 dated Nov. 11, 2019, 7 pages.

Final Office Action in U.S. Appl. No. 16/385,237, USPTO, dated Jan. 23, 2020, 27 pages.

Non-Final Office Action in U.S. Appl. No. 16/385,237, USPTO, dated Jun. 19, 2019, 22 pages.

* cited by examiner

FORCE SIGNAL PROCESSING

CROSS-REFERENCE TO RELATED APPLICATIONS

This application is based upon, and claims the benefit of priority from United Kingdom Patent Application No. GB1909827.6, filed on Jul. 9, 2019, the entire contents of which are hereby incorporated by reference.

FIELD OF THE INVENTION

The present invention relates to methods of processing signals from a touch panel for force sensing.

BACKGROUND

Touch screen panels having force-sensing capabilities can enhance user experience through three-dimensional multi-touch interaction.

In a touch panel, drive and sensing electrodes are used for projective capacitive touch detection. To add force-detection capabilities, a piezoelectric layer, an electrode (which may be the drive or sensing electrode) and a counter electrode, which is held at a fixed voltage or ground, are employed. Additional dielectric layers such as PET thin film, adhesives and cover glass may be included to integrate the layers and provide mechanical robustness. Together, the configuration of the layers in the sensor stack defines a sensor architecture.

Examples of touch sensors combining capacitive sensing with piezoelectric based force-detection capabilities are described in WO 2016/102975 A1. This document also describes examples of embedded touch panels (in which electrodes are interspersed with display elements such as polarisers etc), in which a patterned electrode is positioned between a user input surface and the drive and sensing electrodes. Further examples of touch sensors combining capacitive sensing with piezoelectric based force-detection capabilities are described in WO 2017/109455 A1.

EP 2 902 886 A1 describes a touch input device including a touch panel, a push amount calculating unit and a touch detection signal generating unit. The touch panel includes a piezoelectric sensor and an electrostatic sensor. The piezoelectric sensor outputs to a push amount calculating unit a push signal corresponding to a displacement amount obtained by pushing an operation surface. The electrostatic sensor outputs touch signals corresponding to a touch and a non-touch, to a touch detection signal generating unit. The touch detection signal generating unit outputs to the push amount calculating unit the touch detection signals binarized according to a touch state and a non-touch state. The push amount calculating unit integrates differences between push signals and a reference potential during a period in which a touch detection signal indicating a touch state is inputted, generates a push amount detection signal and outputs the push amount detection signal. The push amount calculating unit resets a reference potential during a period in which a touch detection signal indicating a non-touch state is inputted.

JP 2015/097068 A describes a touch input device including a touch panel having a piezoelectric substance, and a pressure detection part for detecting a static pressure load to the touch panel. The pressure detection part detects the static pressure load on the basis of an integrated value of an electric signal occurring when the piezoelectric substance is pressed.

Touch panels which use piezoelectric based force-detection without a secondary location sensing method (for example resistive or capacitive touch sensing) have been proposed. For example JP 2010-026938 A describes a touch panel which includes a piezoelectric body layer containing a polyvinylidene fluoride-ethylene tetrafluoride copolymer, a first electrode provided on one surface of the piezoelectric body layer, and a second electrode provided on the other surface of the piezoelectric body layer.

SUMMARY

According to a first aspect of the invention, there is provided a method of processing a number of force values. Each force value corresponds to a sensor location. The sensor locations are spaced apart along a direction. The method includes receiving the force values. The method also includes determining whether the force values include one or more candidate peaks. Each candidate peak corresponds to a local maximum of the force values. The method also includes, in response to at least one candidate peak exceeds a minimum force threshold, interpolating the force values and estimating a number of peak coordinates and corresponding peak force values based on the interpolated force values and the candidate peaks which exceed the minimum force threshold.

The method may also include receiving the sensor locations corresponding to the force values. The method may also include retrieving stored sensor locations corresponding to the force values.

The peak coordinates may be estimated to a precision which is less than a minimum spacing of the sensor locations. In other words, the estimated peak coordinates may lie between adjacent sensor locations.

The number of peak coordinates and corresponding peak force values estimated may be less than or equal to the number of candidate peaks.

The method may also include outputting any estimated peak coordinates and the corresponding peak force values.

The method may also include, in response to at least one peak force value exceeds a second force threshold, outputting each peak force value which exceeds the second force threshold and the corresponding peak coordinates.

The method may also include, for each peak coordinate, in response to determining that the peak coordinate is associated with a tracked touch event, adding the peak coordinate to a coordinate buffer which stores a number of previously estimated peak coordinates for the tracked touch event, calculating an average coordinate based on the coordinate buffer and outputting the average coordinate and the peak force value.

The method may also include, for each peak coordinate, in response to determining that the peak coordinate is not associated with any tracked touch event, storing the peak coordinate and the corresponding peak force value to a new tracked touch event and outputting the peak coordinate and the corresponding peak force value.

Interpolating the plurality of force values may include calculating a polynomial spline using the plurality of force values. The polynomial spline may be a cubic spline.

Each candidate peak may correspond to a candidate sensor location and a candidate force value. Estimating a number of peak coordinates and corresponding peak force values based on the interpolated force values and the one or more candidate peaks may include, for each candidate peak, in response to determining that the candidate sensor location is equal to a minimum or maximum sensor location, calculating stationary points of a first spline segment connecting the candidate sensor location and the adjacent sensor location, determining whether a first stationary point corresponding to a maximum is located within the first spline segment, in response to a positive determination, assigning a peak coordinate equal to the first stationary point and assigning a corresponding peak value equal to evaluating the first spline segment at the peak coordinate, and in response to a negative determination, assigning a peak coordinate equal to the candidate sensor location and assigning a corresponding peak value equal to the candidate force value.

Estimating a number of peak coordinates and corresponding peak force values based on the interpolated force values and the one or more candidate peaks may include, for each candidate peak, in response to determining that the candidate sensor location does not correspond to a minimum or maximum sensor location, calculating stationary points of a second spline segment connecting the candidate sensor location and the adjacent sensor location corresponding to the largest force value, in response to determining that a second stationary point corresponding to a maximum is located within the second spline segment, assigning a peak coordinate equal to the second stationary point and assigning a corresponding peak value equal to evaluating the second spline segment at the peak coordinate, in response to determining that a stationary point corresponding to a maximum is not located within the second spline segment, calculating stationary points of a third spline segment connecting the candidate sensor location and the other adjacent sensor location, in response to determining that a third stationary point corresponding to a maximum is located within the third spline segment, assigning a peak coordinate equal to the third stationary point and assigning a corresponding peak value equal to evaluating the third spline segment at the peak coordinate.

Each candidate peak may correspond to a candidate sensor location and a candidate force value. Estimating a number of peak coordinates and corresponding peak force values based on the interpolated force values and the one or more candidate peaks may include, for each candidate peak, in response to determining that the candidate sensor location corresponds to a minimum or maximum sensor location, calculating stationary points of a first spline segment connecting the candidate sensor location and the adjacent sensor location, determining whether a first stationary point corresponding to a maximum is located within the first spline segment, in response to a positive determination, assigning a peak coordinate equal to the first stationary point and assigning a corresponding peak value equal to evaluating the first spline segment at the peak coordinate, and in response to a negative determination, assigning a peak coordinate equal to the candidate sensor location and assigning a corresponding peak value equal to the candidate force value.

Estimating a number of peak coordinates and corresponding peak force values based on the interpolated force values and the one or more candidate peaks may include, for each candidate peak, in response to determining that the candidate sensor location does not correspond to a minimum or maximum sensor location, calculating stationary points of a second spline segment connecting the candidate sensor location to one of the adjacent sensor locations and, in response to determining that a second stationary point corresponding to a maximum is located within the second spline segment, assigning the second stationary point as valid and high priority, in response to determining that the second stationary point is located within the third spline segment, assigning the second stationary point as valid and low priority, calculating stationary points of a third spline segment connecting the candidate sensor location to the other adjacent sensor location, in response to determining that a third stationary point corresponding to a maximum is located within the third spline segment, assigning the third stationary point as valid and high priority, and in response to determining that the third stationary point corresponding to a maximum is located within the second spline segment, assigning the third stationary point as valid and low priority. A peak coordinate and a corresponding peak value may be assigned according to, in response to the second stationary point is valid and there is no valid third stationary point, assigning the peak coordinate equal to the second stationary point and assigning the corresponding peak value equal to evaluating the second spline segment at the peak coordinate, in response to the third stationary point is valid and there is no valid second stationary point, assigning the peak coordinate equal to the third stationary point and assigning the corresponding peak value equal to evaluating the third spline segment at the peak coordinate, in response to the second stationary point is high priority and the third stationary point is low priority, assigning the peak coordinate equal to the second stationary point and assigning the corresponding peak value equal to evaluating the second spline segment at the peak coordinate, in response to the third stationary point is high priority and the second stationary point is low priority, assigning the peak coordinate equal to the third stationary point and assigning the corresponding peak force value equal to evaluating the third spline segment at the peak coordinate, and in response to the second and third stationary points are both high priority or both low priority, assigning the peak coordinate equal to whichever of the second and third stationary points corresponds to the larger force value and assigning the corresponding peak force value equal to evaluating the respective spline segment at the peak coordinate.

Interpolating the force values may include obtaining a frequency spectrum by calculating a discrete Fourier transform based on the plurality of force values, generating a zero-inserted frequency spectrum by inserting a number of zero values at a high frequency end of the frequency spectrum, and obtaining interpolated force values based on calculating an inverse discrete Fourier transform of the zero-inserted frequency spectrum.

Obtaining interpolated force values may include calculating the inverse discrete Fourier transform of the zero-inserted frequency spectrum and removing forced-periodicity artefacts. Removing forced-periodicity artefacts from the inverted zero-inserted frequency spectrum may include removing a segment of interpolated force values which are less than a minimum of the force values or a last value of the force values. When a segment of interpolated force values are removed, the remaining interpolated force values may be warped to continuously span the range between minimum and maximum sensor location coordinates.

Estimating a number of peak coordinates and corresponding peak force values based on the interpolated force values and the one or more candidate peaks may include, for each candidate peak, searching for a local maximum of the interpolated force values using the candidate peak as a starting location, and in response to locating a local maximum of the interpolated force values which has not already been assigned to another candidate peak, assigning a peak force value equal to the local maximum and assigning a corresponding peak coordinate equal to a location of the local maximum.

The method may also include transforming the force values corresponding to sensor locations to transformed force values corresponding to equi-spaced locations, wherein the frequency spectrum is obtained by calculating a discrete Fourier transform of the transformed force values.

The transformation of the force values to the transformed force values may include interpolation based on the pair of sensor locations and force values bracketing each equi-spaced location.

The method may include processing a number first force values and a number of second force values. Each first force value may correspond to a first sensor location. The first sensor locations may be spaced apart along a first direction. Each second force value may correspond to a second sensor location. The second sensor locations may be spaced apart along a second direction which is different to the first direction. Peak coordinates estimated based on the first force values may be matched with peak coordinates estimated based on the second force values to obtain two-dimensional coordinates. The matching may take account of the corresponding peak force values.

Peak force values may be estimated based on an average or a weighted average of first peak values determined based on the first force values and second peak values determined based on the second force values.

According to a second aspect of the invention, there is provided a method of processing signals from a touch panel which includes a layer of piezoelectric material arranged between a plurality of first electrodes and at least one second electrode. The method includes receiving one or more piezoelectric signals from the first electrodes. The method also includes, for each piezoelectric signal, calculating a corrected piezoelectric value by subtracting a first DC offset value from the piezoelectric signal. The method also includes, for each piezoelectric signal, determining whether the corrected piezoelectric value exceeds a piezoelectric signal threshold, in response to a positive determination, setting a force value equal to the sum of a previous force value and the corrected piezoelectric value and in response to a negative determination, setting the force value equal to the previous force value. The method also includes, for each piezoelectric signal, adding the force value to a buffer storing a number of previous force values or adding the corrected piezoelectric value to a buffer storing a number of previous corrected piezoelectric values. The method also includes, for each piezoelectric signal, calculating a gradient value, an average value and a variance value of the values stored in the buffer. The method also includes, for each piezoelectric signal, determining whether the gradient value is below a gradient threshold and the variance value is below a variance threshold, in response to a positive determination, updating a second DC offset value to equal to the average value and in response to a negative determination, not updating the second DC offset value. The method also includes, for each piezoelectric signal, calculating a corrected force value based on the force value and the second DC offset value.

The second DC offset value may be initialised to zero. The method may include outputting the corrected force value.

When the buffer stores a number of force values, calculating a corrected force value based on the force value and the second DC offset value may comprise subtracting the second DC offset value from the force value.

When the buffer stores a number of corrected piezoelectric values, calculating a corrected force value based on the force value and the second DC offset value may comprise subtracting from the force value a product of the second DC offset value and the number of corrected piezoelectric values stored by the buffer.

When the buffer stores a number of corrected piezoelectric values, calculating a corrected force value based on the force value and the second DC offset value may comprise subtracting each buffered corrected piezoelectric value which exceeds the piezoelectric signal threshold, and adding each difference of a buffered corrected piezoelectric value and the second DC offset which exceeds the second DC offset.

The force values processed by the first aspect may correspond to corrected force values calculated according to the second aspect.

The first force values and the second force values processed by the first aspect may correspond to corrected force values calculated according to the second aspect According to a third aspect of the invention, there is provided apparatus including a controller configured to carry out the method of the first and/or second aspects.

According to a fourth aspect of the invention, there is provided apparatus for processing piezoelectric signals received from a touch panel which includes a layer of piezoelectric material arranged between a plurality of first electrodes and at least one second electrode. The apparatus includes a number of first force channels. Each first force channel is configured to receive piezoelectric signals from one or more first electrodes of the touch panel which correspond to first sensor locations which are spaced apart along a first direction. Each first force channel is configured to calculate a first force value corresponding to the received piezoelectric signals. The apparatus also includes a location processing module configured to receive the plurality of first force values. The location processing module is also configured to determine whether the first force values include one or more first candidate peaks. Each first candidate peak corresponds to a local maximum of the first force values. The location processing module is also configured to, in response to at least one first candidate peak exceeds a minimum force threshold, interpolate the plurality of first force values, and estimate a number of first peak coordinates and corresponding first peak force values based on the interpolated first force values and the first candidate peaks which exceed the minimum force threshold.

The first force channels and the location processing module may be implemented in a single device. The first force channels and the location processing module may be implemented using one or more micro-controllers or application specific integrated circuits.

The apparatus may also include a number of second force channels. Each second force channel may be configured to receive piezoelectric signals from one or more first electrodes of the touch panel which correspond to second sensor locations which are spaced apart along a second direction which is different from the first direction. Each second force channel may be configured to calculate a second force value corresponding to the received piezoelectric signals. The location processing module may be further configured to receive the plurality of second force values. The location processing module may be further configured to calculate second force values corresponding to piezoelectric signals which correspond to first electrodes arranged at second sensor locations which are spaced apart along a second direction which is different to the first direction. The location processing module may be further configured to determine whether the second force values include one or more second candidate peaks. Each second candidate peak may correspond to a local maximum of the second force values. The location processing module may be further configured to, in response to at least one second candidate peak exceeds a minimum force threshold, interpolate the plurality of second force values, and estimate a number of second peak coordinates and corresponding second peak force values based on the interpolated second force values and the second candidate peaks which exceed the minimum force threshold. The location processing module may be further configured to match first peak coordinates with second peak coordinates to obtain two-dimensional coordinates.

The first force channels, the second force channels and the location processing module may be implemented in a single device. The first force channels, the second force channels and the location processing module may be implemented using one or more micro-controllers or application specific integrated circuits.

Each first or second force channel may be configured to calculate the corresponding force values as corrected force values according to the second aspect.

A system may include the apparatus and a touch panel. The touch panel may include a layer of piezoelectric material arranged between a number of first electrodes and at least one second electrode.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Figure 1:
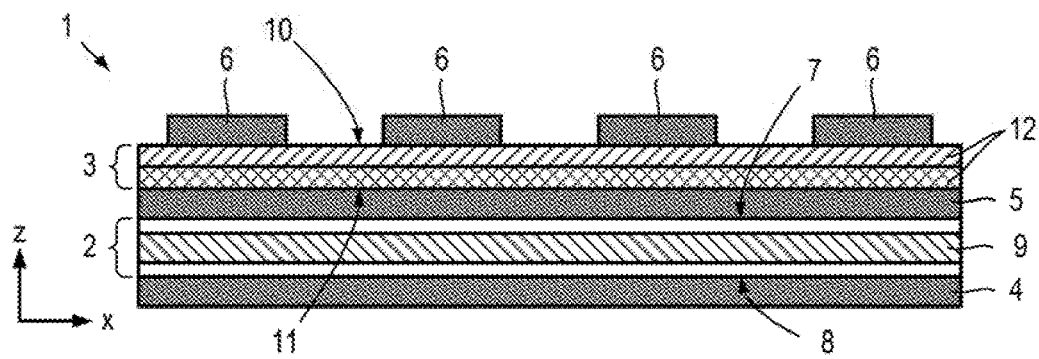
FIG. 1 is a schematic cross section of a touch panel for piezoelectric sensing.

In the following, like parts are denoted by like reference numerals.

A problem which is encountered in piezoelectric force sensing is that the signals generated by applying force to a piezoelectric material are inherently transient. Consequently, output signals from piezoelectric force sensors require processing to allow measurements of static or slowly varying applied forces. The methods of the present specification are concerned with improving the accuracy and reliability of forces measured using a piezoelectric based touch panel system, whilst maintaining or improving the speed of processing the piezoelectric force signals received from the touch panel. The present specification is also concerned with improving measurements of static or slowly varying applied forces without relying on a secondary measurement method such as capacitance sensing for detecting the presence and/or location(s) of one or more user interactions.

Touchpanel system: Referring to FIG. 1, a simplified cross-section of a piezoelectric touch panel 1 is shown.

The touch panel 1 includes first and second layer structures 2, 3, a common electrode 4, a number of first sensing electrodes 5 and a number of second sensing electrodes 6.

The first layer structure 2 has a first face 7 and a second, opposite, face 8. The first layer structure 2 includes one or more layers, including at least a layer of piezoelectric material 9. Each layer included in the first layer structure 2 is generally planar and extends in first and second directions x, y which are perpendicular to a thickness direction z. The one or more layers of the first layer structure 2 are arranged between the first and second faces 7, 8 such that the thickness direction z of each layer of the first layer structure 2 is perpendicular to the first and second faces 7, 8. The first sensing electrodes 5 are disposed on the first face 7 of the first layer structure 2, and the common electrode 4 is disposed on the second face 8 of the first layer structure 2.

Preferably, the piezoelectric layer 9 is formed of a piezoelectric polymer, for example a suitable fluoropolymer such as polyvinylidene fluoride (PVDF). However, the piezoelectric layer may alternatively be formed from a layer of a piezoelectric ceramic such as lead zirconate titanate (PZT).

The second layer structure 3 has a third face 10 and a fourth, opposite, face 11. The second layer structure 3 includes one or more dielectric layers 12. Each dielectric layer 12 is generally planar and extends in first and second directions x, y which are perpendicular to a thickness direction z. The one or more dielectric layers 12 of the second layer structure 3 are arranged between the third and fourth faces 10, 11 such that the thickness direction z of each dielectric layer 12 of the second layer structure 3 is perpendicular to the third and fourth faces 10, 11. The second sensing electrodes 6 are disposed on the third face 10 of the second layer structure 3, and the fourth face 11 of the second layer structure 3 contacts the first sensing electrodes 5. Alternatively, the first sensing electrodes 5 may be disposed on the fourth face 11.

Preferably, the dielectric layer(s) 12 include layers of a polymer dielectric material such as polyethylene terephthalate (PET) or layers of pressure sensitive adhesive (PSA) materials. However, the dielectric layer(s) 12 may include layers of a ceramic insulating material such as aluminium oxide.

Preferably, the common electrode 4, the first sensing electrodes 5 and/or the second sensing electrodes 6 are formed of indium tin oxide (ITO) or indium zinc oxide (IZO). However, the common electrode 4, the first sensing electrodes 5 and/or the second sensing electrodes 6 may be formed of conductive polymers such as polyaniline, polythiphene, polypyrrole or poly(3,4-ethylenedioxythiophene) polystyrene sulfonate (PEDOT/PSS). The common electrode 4, the first sensing electrodes 5 and/or the second sensing electrodes 6 may take the form of metal films such as aluminium, copper, silver or other metals suitable for deposition and patterning as a thin film. The common electrode 4, the first sensing electrodes 5 and/or the second sensing electrodes 6 may be formed from a metal mesh, nanowires, optionally silver nanowires, graphene, or carbon nanotubes.

Although the examples described in this specification relate primarily to methods for piezoelectric force sensing, the touch panel 1 may optionally be used for capacitance measurements in addition to piezoelectric force sensing. For example, to measure the self-capacitance of each first electrode 5 and each second electrode 6, or to measure mutual capacitances between a pair of a first electrode 5 and a second electrode 6.

Figure 2:
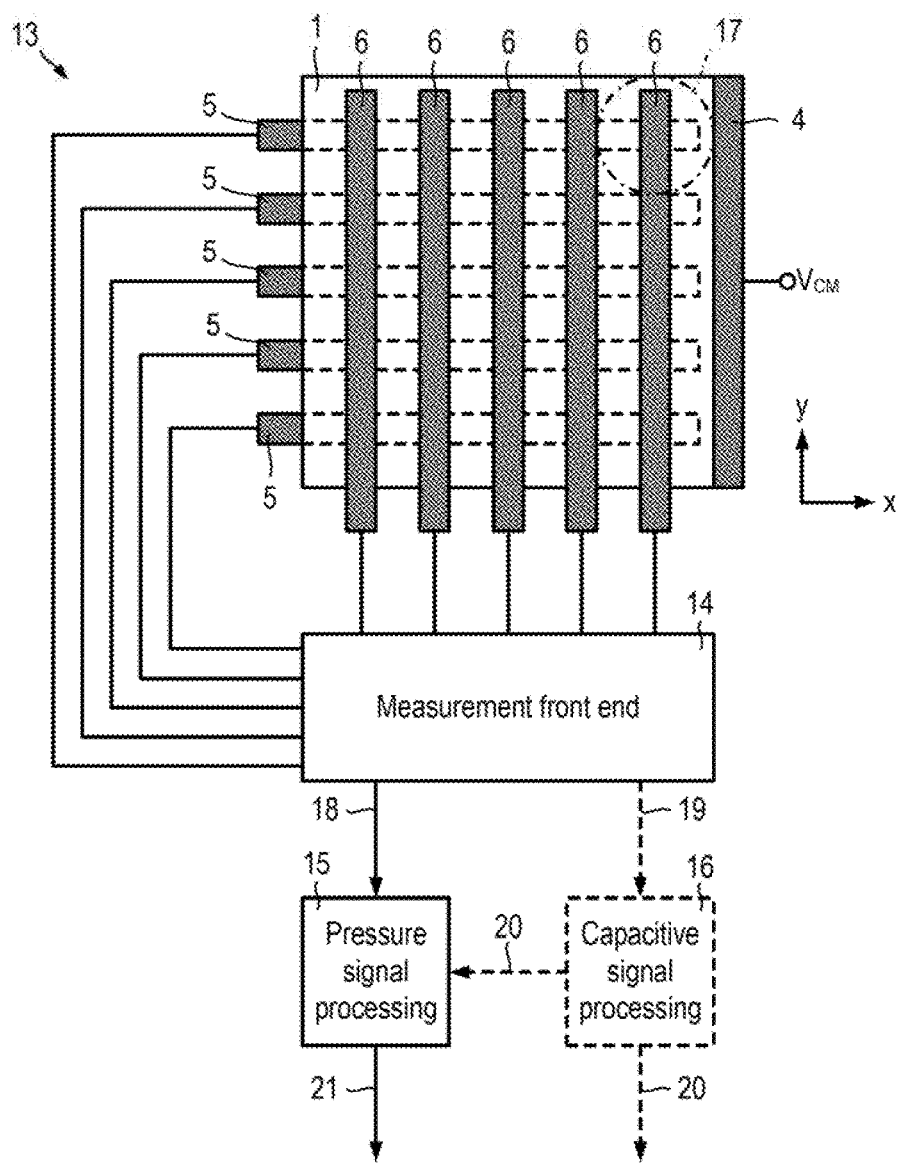
FIG. 2 schematically illustrates a system for piezoelectric sensing.

Referring also to FIG. 2, a force sensing system 13 is shown.

The force sensing system 13 includes a touch panel 1, a measurement front end 14, and a force signal processing module 15. Optionally, in some examples the system 13 may also include a capacitive signal processing module 16.

The first sensing electrodes 5 each extend in the first direction x and the first sensing electrodes 5 are disposed in an array evenly spaced in the second direction y. The second sensing electrodes 6 each extend in the second direction y and the second sensing electrodes 6 are disposed in an array evenly spaced in the first direction x. The common electrode 4 is extensive such that the common electrode 4 at least partially underlies each of the first and second sensing electrodes 5, 6. The common electrode 4 may be substantially coextensive with the second face 8 of the first layer structure 2.

When the optional capacitive signal processing module 16 is included, each intersection 17 of a first sensing electrode 5 with a second sensing electrode 6 may effectively provide a separate touch sensor for mutual capacitance sensing.

The touch panel 1 may be bonded overlying a display (not shown) of an electronic device (not shown) which incorporates the force sensing system 13. For example, the force sensing system 13 may be incorporated into a mobile telephone, a tablet computer, a portable or laptop computer, a display, a television, and so forth.

Herein, the term "user interaction" will generally refer to a user pressing a touch panel 1 or a layer of material overlying the touch panel 1. A user interaction may involve a user's digit or a stylus (whether conductive or not). A user interaction will generally be understood as involving a user pressing the touch panel 1 with sufficient force to cause straining of the layer of piezoelectric material 9 and a detectable piezoelectric response. The location of a user interaction may change with time as a user moves a digit or stylus. The touch panel 1 and system 13 support the measurement and tracking of one or more concurrent user interactions, sometimes referred to as "multi-touch" interactions.

When the optional capacitive signal processing module 16 is included, a user interaction may additionally include a user's digit or conductive stylus being proximate to the touch panel 1 without direct physical contact or without applying significant force.

The measurement front end 14 performs piezoelectric force measurements on the touch panel 1. The measurement front end 14 measures forces by detecting the voltages induced between the first sensing electrodes 5 and the common electrode 4 by straining of the piezoelectric layer 9 in response to one or more user interactions. The measurement front end 14 also measures voltages induced between the second sensing electrodes 6 and the common electrode 4. In this way, the measurement front end 14 may provide two-dimensional resolved measurements of forces applied to the touch panel 1 by one or more user interactions.

When the optional capacitive signal processing module 16 is included, the measurement front end 14 may also measure mutual capacitances for each intersection 17 of the first and second sensing electrodes 5, 6.

When the optional capacitive signal processing module 16 is included, the measurement front end 14 may measure piezoelectric force signals and capacitances concurrently. For example, the measurement front end 14 may be configured as described in WO 2017/109455 A1, or as described in WO 2016/102975 A2, and the entire contents of both documents are hereby incorporated by reference. In particular, suitable combined force and capacitance touch panel systems 13 are shown in, and described with reference to, FIGS. 4 to 23 of WO 2017/109455 A1. Furthermore, suitable combined force and capacitance touch panel systems 13 are shown in, and described with reference to, FIGS. 15 to 29 of WO 2016/102975 A2.

The measurement front end 14 outputs piezoelectric signals 18. The piezoelectric signals 18 correspond to amplified and/or integrated piezoelectric voltages induced between the first sensing electrodes 5 and the common electrode 4 and/or between the second sensing electrodes 6 and the common electrode 4. The measurement front end 14 may include a low-frequency cut-off filter configured to reject a pyroelectric response of the layer of piezoelectric material 9. The low frequency cut-off may take a value between 1 Hz and 7 Hz. The measurement front end 14 may include a notch filter configured to reject a mains power distribution frequency, for example, 50 Hz or 60 Hz.

When the optional capacitive signal processing module 16 is included, the measurement front end 14 may also output capacitance signals 19. When the measurement front end 14 is configured to measure piezoelectric signals and capacitances concurrently, for example, when the measurement front end 14 is configured as described in WO 2017/109455 A1 or as described in WO 2016/102975 A2, the piezoelectric signals 18 and capacitance signals 19 are obtained by frequency separation of signals corresponding to each sensing electrode 5, 6 to obtain the signals 18, 19.

When the optional capacitive signal processing module 16 is included, the capacitive signal processing module 16 receives and processes the capacitance signals 19 to determine capacitance information 20, which may include a number of user interactions and the x-y coordinates of each user interaction. The capacitive signal processing module 16 may function in the same way as a conventional capacitive touch controller, and may be provided by a conventional capacitive touch controller. In some examples, the capacitive signal processing module 16 also provides driving signals for the capacitance measurements to the measurement front end 14. The self-capacitances of the sensing electrodes 5, 6, or the mutual capacitances between any pair of a first sensing electrode 5 and a second sensing electrode 6, may be measured by the capacitive signal processing module 16 according to known methods.

The force signal processing module 15 receives the piezoelectric signals 18. The force signal processing module 15 is configured to measure, using the piezoelectric signals 18, one or more output forces F corresponding to user interactions applying force to the touch panel 1. The calculation of output forces F does not depend upon input of the capacitance information 20 or the unprocessed capacitance signals 19. The force signal processing module 15 is configured to analyse the measured output forces F in order to determine force information 21 which includes the number of user interactions, the x-y coordinates of each user interaction and also a force applied by each user interaction.

When the optional capacitive signal processing module 16 is included, the force signal processing module 15 may also receive the capacitance information 20, which may be useful for confirming the force information 21.

Although the first and second sensing electrodes 5, 6 have been shown as being substantially rectangular, any other electrode shapes or patterns known for use in projected capacitance touch panels may be used. For example, diamond patterned electrodes may be used for the first and second sensing electrodes 5, 6.

The first layer structure 2 of the touch panel 1 may include only the layer of piezoelectric material 9, such that the first and second opposite faces 7, 8 are faces of the piezoelectric material layer 9. Alternatively, the first layer structure 2 may include one or more dielectric layers 12 which are stacked between the layer of piezoelectric material 9 and the first face 7 of the first layer structure 2. The first layer structure 2 may include one or more dielectric layers 12 stacked between the second face 8 of the first layer structure 2 and the layer of piezoelectric material 9.

The second layer structure 3 may include a single dielectric layer 12, such that the third and fourth opposite faces 10, 11 are faces of a single dielectric layer 12. Alternatively, a second layer structure 3 need not be used, and the second sensing electrodes 6 could instead be disposed on the first face 7 along with the first sensing electrodes 5.

In FIGS. 1 and 2, the first and second faces 7, 8 and the layers of the first and second layer structures 2, 3 are shown extending along orthogonal axes labelled x and y, and the thickness direction of each layer of the first and second layer structures 2, 3 is aligned with an axis labelled z which is orthogonal to the x and y axes. However, the first, second and thickness directions x, y, z need not form a right handed orthogonal set as shown. For example, the first and second directions x, y may intersect at an angle of 30 degrees or 45 degrees or any other angle greater than 0 degrees and less than 90 degrees.

The details of the touch panel 1 and system 13 described hereinbefore, and further details discussed with reference to WO 2017/109455 A1 and WO 2016/102975 A2 are provided for the purposed of understanding the methods of the present specification, but the methods of the present specification are not limited to the touch panel 1 and system 13.

The methods of the present specification may be employed with any touch panel system which includes an array of piezoelectric sensors.

Figure 3:
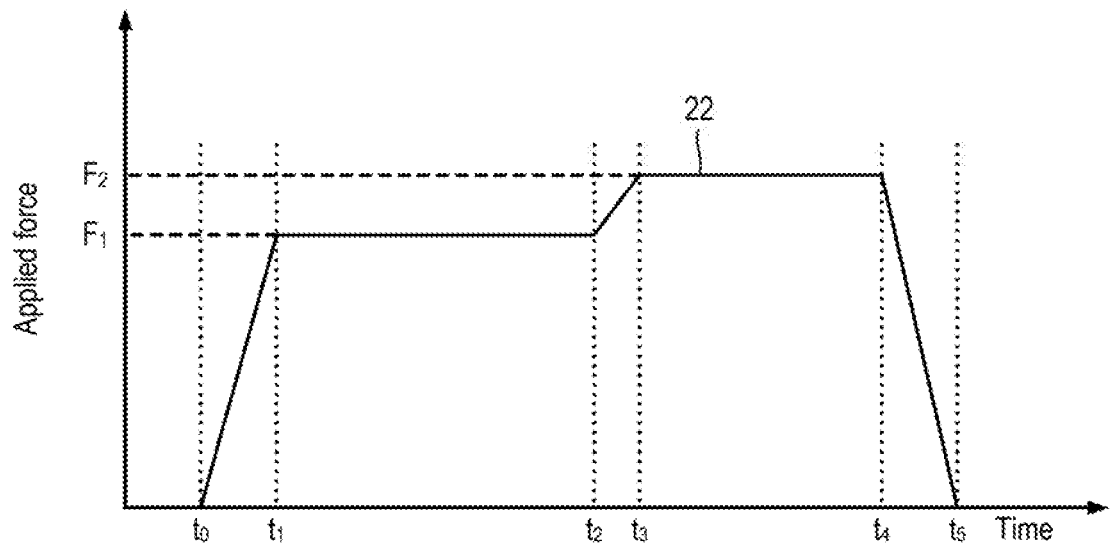
FIG. 3 schematically illustrates a force profile of a user interaction with a touch panel.

Referring also to FIG. 3 a schematic force input 22 applied to the touch panel 1 is shown.

The layer of piezoelectric material 9 is poled and becomes polarised with a polarisation $\underline{P}$ in response to straining caused by a user interaction applying force to the touch panel 1. The polarisation $\underline{P}$ of the layer of piezoelectric material 9 results in a corresponding charge $Q_{piezo}(t)$ being developed between the common electrode 4 and the sensing electrodes 5, 6. The straining which produces the polarisation $\underline{P}$ may result from a compression or a tension. The straining which produces the polarisation $\underline{P}$ may be an in-plane stretching of the piezoelectric material layer 9. Intimate contact between the layer of piezoelectric material 9 and the sensing electrodes 5, 6 is not required. Generally, a greater straining of the layer of piezoelectric material 9 (caused by a more forceful user interaction) will result in a greater polarisation $\underline{P}$ and a correspondingly larger magnitude of charge $Q_{piezo}(t)$ being induced on proximate sensing electrodes 5, 6. A piezoelectric response $I_{piezo}(t)$, which is the current associated with the charge $Q_{piezo}(t)$, may be amplified and/or integrated to determine a piezoelectric signal 18.

Figure 4:
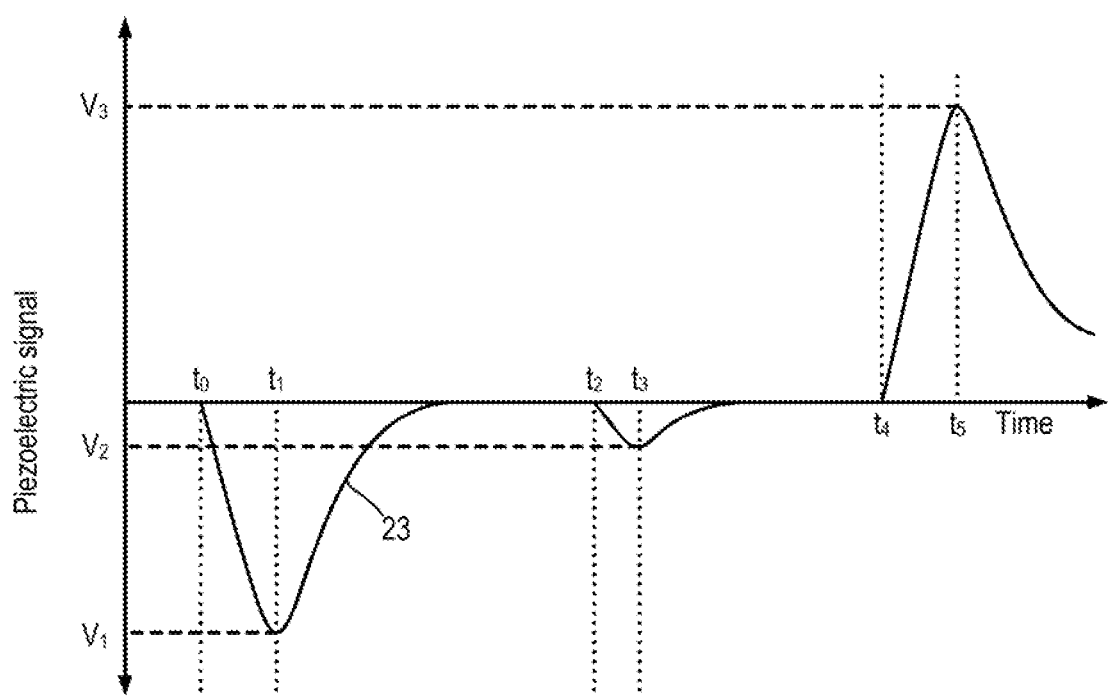
FIG. 4 illustrates an idealised piezoelectric signal corresponding to the force profile shown in FIG. 3.

Referring also to FIG. 4, an idealised piezoelectric signal 23 corresponding to the force input 22 is shown.

Piezoelectric signal 23 represents an idealised example of a piezoelectric signal 18. A piezoelectric signal 18, 23, for example as output from and/or amplified by the measurement front end 14, is a transient signal. The induced piezoelectric voltages decay with time due to leakage currents. Moreover, the output of an integrating charge amplifier, which may be used to amplify a piezoelectric current $I_{piezo}$, also decays with time.

For example, during a first loading period, $t_0 \leq t \leq t_1$, the force 22 increases steadily from zero to a first force value $F_1$. Provided that the rate of increase of the force 22 is fast compared to the rate of decay of the piezoelectric signal 23, the corresponding piezoelectric signal 23 decreases steadily during the first loading period $t_0 \leq t \leq t_1$, reaching a first peak value of $V_1$ as the force 22 reaches the first force value $F_1$. The force 22 is held constant at $F_1$ for a first holding period, $t_1 < t \leq t_2$. During the first holding period, $t_1 < t \leq t_2$, the piezoelectric signal 23 decays upwards from the first peak value $V_1$ towards, in the ideal case, zero DC offset.

The force 22 increases again from the first force value $F_1$ to a second force value $F_2$ during a second loading period $t_2 < t \leq t_3$. Provided that the rate of increase of the force 22 is fast compared to the rate of decay of the piezoelectric signal 23, the corresponding piezoelectric signal 23 decreases steadily during the second loading period $t_2 < t \leq t_3$, reaching a second peak value of $V_2$ as the force 22 reaches the second force value $F_2$. The force 22 is then held constant at $F_2$ for a second holding period, $t_3 < t \leq t_4$. During the second holding period, $t_3 < t \leq t_4$, the piezoelectric signal 23 decays upwards from the second peak value $V_2$ towards, in the ideal case, zero signal.

At the end of the second holding period, $t_3 < t \leq t_4$, the user interactions ends with the release of the force 22 during an unloading period $t_4 < t \leq t_5$. Provided that the rate of decrease of the force 22 is fast compared to the rate of decay of the piezoelectric signal 23, the corresponding piezoelectric signal 23 increases steadily during the unloading period $t_4 < t \leq t_5$, reaching a third peak value $V_3$, as the force 22 reaches zero. The third peak value $V_3$, resulting from unloading rather than loading, has opposite sign to the first and second peak values $V_1$, $V_2$. After the end of the user interaction, the piezoelectric signal 23 decays towards, in the ideal case, zero DC offset.

Although FIG. 4 illustrates the piezoelectric signal 23 becoming negative in response to loading and positive in response to unloading, the polarity of the piezoelectric signal 23 may be reversed in other examples, depending on the configuration of the touch panel 1 and system 13.

When the piezoelectric signal 23 is ideal, as illustrated in FIG. 4, the decay of the piezoelectric signal 23 may be compensated for by various methods such as, for example, simple conditional integration of the piezoelectric signal 23 based on the gradient and/or values of the piezoelectric signal 23. By integrating the piezoelectric signal 23 when the gradient and value of the piezoelectric signal 23 have the same sign, an estimated measurement proportional to the applied force 22 may be recovered.

However, when a touch panel 1 and system 13 for combined force and capacitance measurements is used in practice, piezoelectric signals 23 may be subjected to variations in DC offsets and significant sources of noise which may prevent the reliable operation of simple value and gradient based conditional integrations.

Without wishing to be limited by theory or particular, specific, examples, it may be helpful for understanding the present specification to discuss potential sources of DC offset variations and noise for a touch panel 1 and system 13. The touch panel 1 and system 13 may often be installed in a handheld, battery operated device (not shown). Such devices are typically ungrounded, or only weakly grounded, which may increase the susceptibility to noise pickup and to variation in DC offsets. Additionally, a user may frequently become charged with static electricity as a result of interactions between their clothing, footwear and/or their environment. This may further contribute to variations in DC offsets by capacitive coupling, and may also result in electrostatic discharging of the user's digit and/or stylus upon an initial contact with the touch panel 1. Such couplings and/or electrostatic discharges can apply charges $Q_{es}$ to the sensing electrodes 5, 6 close to a user interaction which may equal, or even substantially exceed, charges $Q_{piezo}$ resulting from applied forces. Furthermore, short interactions such as tapping a touch panel 1 in rapid succession may confuse gradient and value based approaches because the signal from one tap may not have completely decayed before the next tap commences, leading to inaccurate measurements of forces. The preceding discussion is not exhaustive, and many additional factors may contribute to DC offset variations and noise levels of a touch panel 1 and system 13. Therefore, there is a need for methods of measuring forces applied to a touch panel 1 with improved reliability, without sacrificing sensitivity and/or computational speed, and without any requirement to receive capacitance information 20 and/or unprocessed capacitance signals 19.

Figure 5:
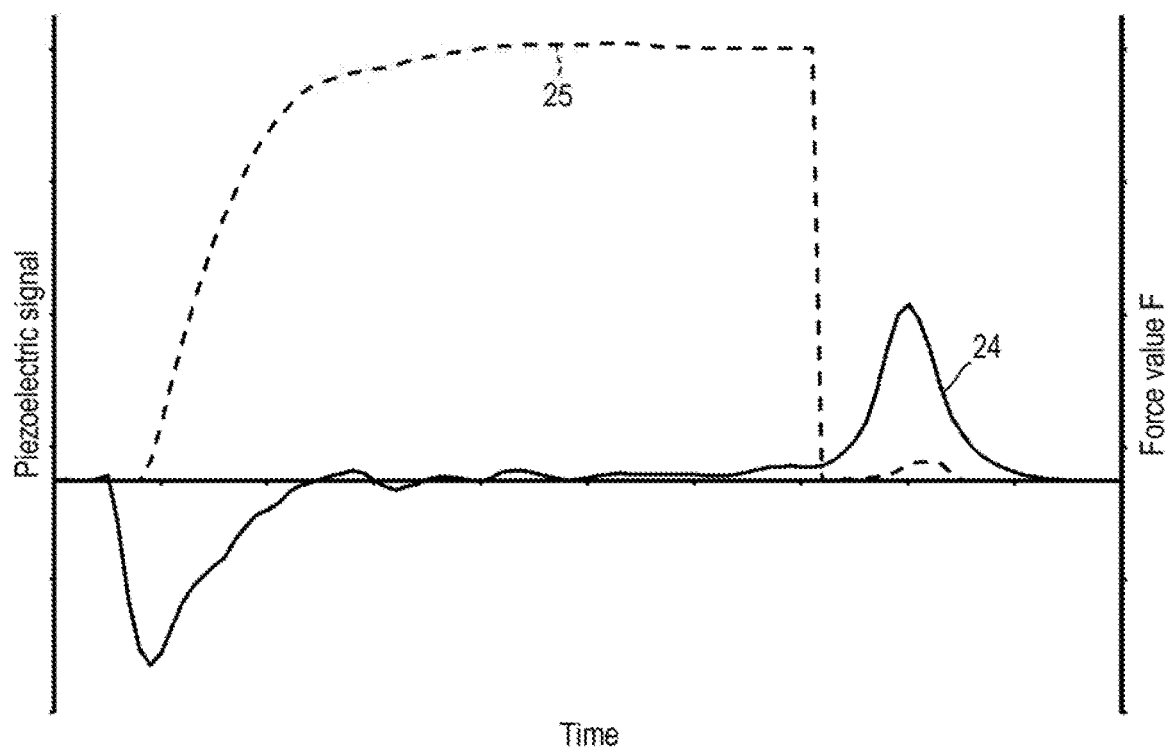
FIG. 5 presents an example of a measured piezoelectric signal.

Example of measured piezoelectric signals: Referring also to FIG. 5, an example of a measured piezoelectric signal 24 obtained using an example of the touch panel 1 and system 13 is shown.

Measured piezoelectric signal 24 is an example of a piezoelectric signal 18. The measured piezoelectric signal 24 is plotted against the primary vertical axis. It may be observed that the measured piezoelectric signal 24 deviates from the ideal piezoelectric signal 23 in several ways. In particular, the measured piezoelectric signal 24 includes noise, and the DC offset during a sustained user interaction applying a substantially contact load is not zero.

Figure 7:
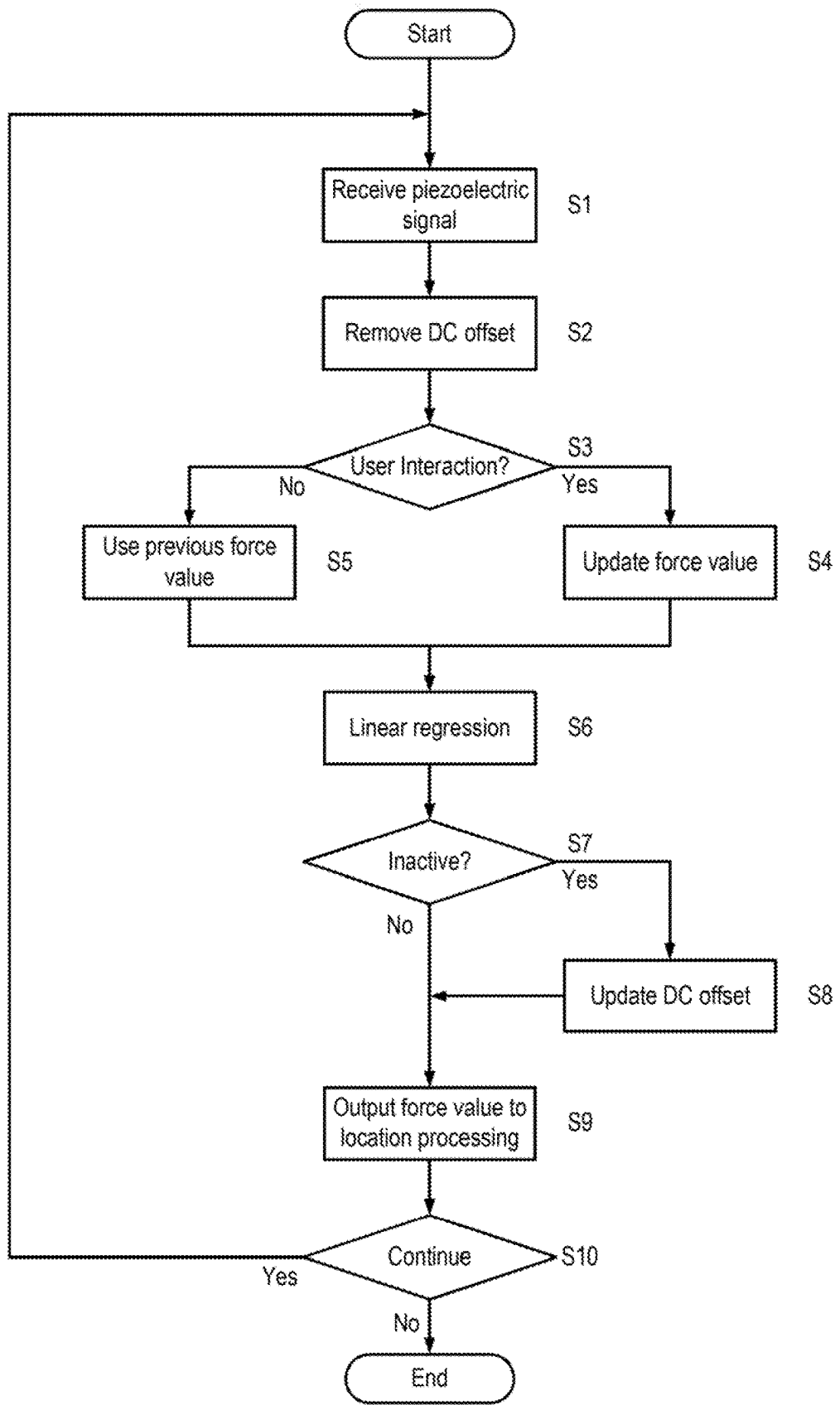
FIG. 7 is a process-flow diagram of a method of calculating force values from corresponding piezoelectric signals.

Force values 25, F(t) determined according to a method described hereinafter in relation to FIG. 7 are plotted against the secondary vertical axis of FIG. 5.

The methods detailed in the present specification are intended to address the issues encountered when piezoelectric measurements are implemented in practice, by providing methods to measure forces applied to a touch panel 1 which are more robust against variations in DC offsets and other sources of noise. The methods detailed in the present specification also permit force values to be used to determine the locations of user interactions. In this way, a force sensing touch system 13 may be used to determine a number of user interactions, as well as the location and applied force of each user interaction, without a need for input of capacitance information 20 or unprocessed capacitance signals 19. This may provide an improved touch panel system which is less complex than a touch panel system which uses a combination of capacitive and piezoelectric measurements to provide location and force information. At the same time, the methods detailed in the present specification may be efficiently executed by a controller, application specific integrated circuit (ASIC), microcontroller or microprocessor at a speed which is sufficient to avoid introducing excessive latency which might be perceptible by a user. Excessive latency may be annoying to a user or, if the latency becomes too large, it may cause providing correct input to become difficult or impossible.

Although touch panel systems based on piezoelectric measurements only have been proposed, such systems have not been widely adopted for use as touch panels. This is believed to be because of the hereinbefore discussed difficulties in obtaining reliable measurements of static or slowly varying forces within a challenging noise environment, and also because of the difficulty of determining accurate user interaction locations from piezoelectric measurements. The methods of the present specification may provide improvements in measurement of force values F and also in determining the coordinates of one or more user interactions.

Figure 6:
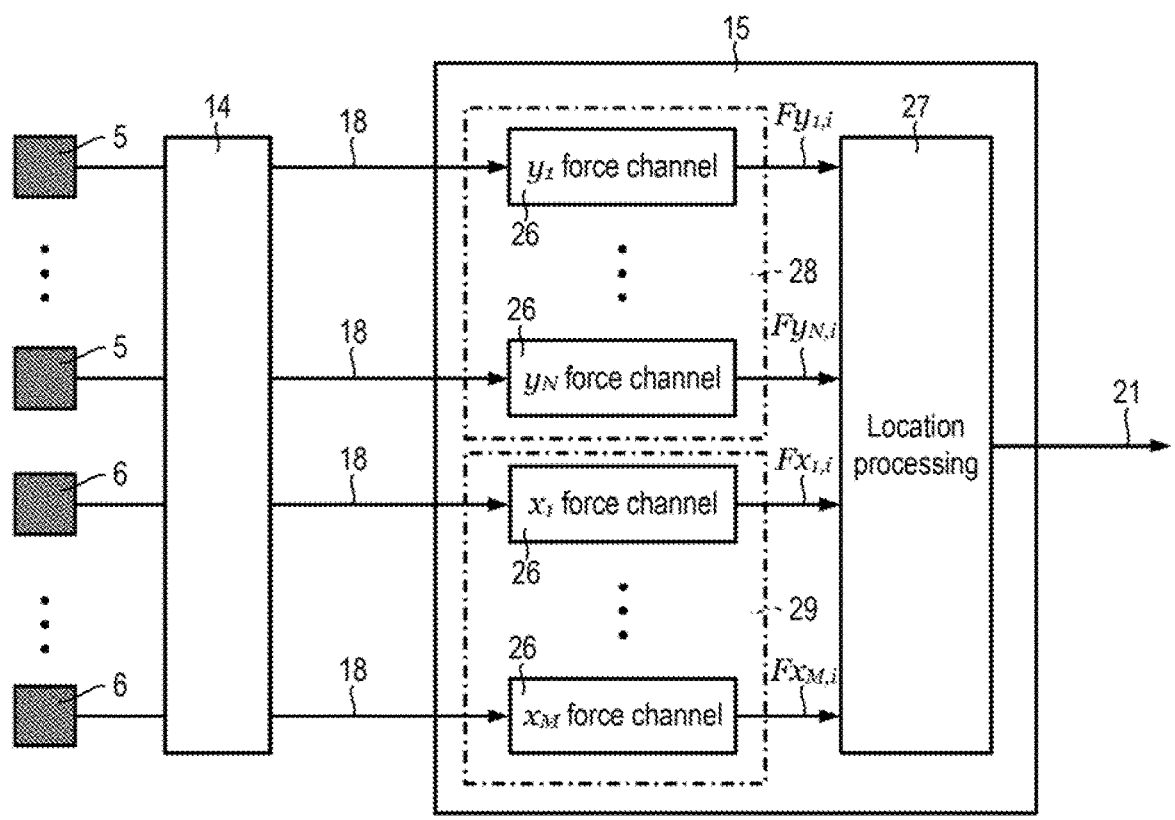
FIG. 6 schematically illustrates a force signal processing module.

Force signal processing module: Referring also to FIG. 6, one example configuration of a force signal processing module 15 is shown.

The force signal processing module 15 includes a number of force channels 26 and a location processing module 27. Each force channel 26 receives a piezoelectric signal 18 from the front end module 14, and calculates a force value F corresponding to the received piezoelectric signal 18. The force values F may be calculated as described hereinafter with reference to FIG. 7.

Each piezoelectric signal 18 may correspond to a single first or second electrode 5, 6. Alternatively, a piezoelectric signal 18 may correspond to a group of two or more adjacent first electrodes 5 or a group of two or more adjacent second electrodes 6. A first group 28 of force channels 26 receives and processes piezoelectric signals 18 originating from the first electrodes 5 and a second group 29 of force channels 26 receives and processes piezoelectric signals 18 originating from the second electrodes 6.

Let P(t) denote a time dependent piezoelectric signal 18 in general. Let $P_i$ denote a piezoelectric signal $P(t_i)$ at time $t_i$, and similarly let $P_{i+1}$ denote a piezoelectric signal $P(t_i+\delta t)$ at time $t_i+\delta t$, in which $\delta t$ is, for example, a sampling interval. Similarly, let F(t) denote a time dependent force value in general, $F_i$ denote a force value $F(t_i)$ at time $t_i$, and similarly let $F_{i+1}$ denote a force value $F(t_i+\delta t)$ at time $t_i+\delta t$.

If the measurement front end 14 outputs a number N of piezoelectric signals 18, P(t) corresponding to the first electrodes 5, let $Py_n(t)$ denote the $n^{th}$ of N piezoelectric signals 18, P(t). Additionally, let $Py_{n,i}$ denote a piezoelectric signal $Py_n(t_i)$ at time $t_i$, and let $Py_{n,i+1}$ denote a piezoelectric signal $Py_n(t_i+\delta t)$ at time $t_i+\delta t$. Similarly, let $Fy_n(t)$ denote the $n^{th}$ of N corresponding force values F(t). Additionally, let $Fy_{n,i}$ denote a force value $Fy_n(t_i)$ at time $t_i$, and let $Py_{n,i+1}$ denote a force value $Fy_n(t_i+\delta t)$ at time $t_i+\delta t$. Let $y_n$ denote a sensor location corresponding the $n^{th}$ of N piezoelectric signals $Py_{n,i}$ and the $n^{th}$ of N force values $Fy_{n,i}$. The sensor location $y_n$ may be a centroid of a particular first electrode 5 or a centroid of a group of two or more adjacent first electrodes 5.

If the measurement front end 14 outputs a number M of piezoelectric signals 18, P(t) corresponding to the second electrodes 6, let $Px_m(t)$ denote the $m^{th}$ of M piezoelectric signals 18, P(t). Additionally, let $Px_{m,i}$ denote a piezoelectric signal $Px_m(t_i)$ at time $t_i$, and let $Px_{m,i+1}$ denote a piezoelectric signal $Px_m(t_i+\delta t)$ at time $t_i+\delta t$. Similarly, let $Fx_m(t)$ denote the $m^{th}$ of M corresponding force values F(t). Additionally, let $Fx_{m,i}$ denote a force value $Fx_m(t_i)$ at time $t_i$, and let $Px_{m,i+1}$ denote a force value $Fx_m(t_i+\delta t)$ at time $t_i+\delta t$. Let $x_m$ denote a sensor location corresponding the $m^{th}$ of M piezoelectric signals $Px_{m,i}$ and the $m^{th}$ of m force values $Fx_{m,i}$. The sensor location $x_m$ may be a centroid of a particular second electrode 6 or a centroid of a group of two or more adjacent second electrodes 6.

The location processing module 27 is configured to receive the first electrode 5 force values $Fy_{n,i}$ (also referred to as first force values $Fy_{n,i}$) and the second electrode force values $Fx_{m,i}$ (also referred to as second force values $Fx_{m,i}$). The location processing module 27 processes the first force values $Fy_{n,i}$ and second force values $Fx_{m,i}$ separately. Although processing of the first force values $Fy_{n,i}$ shall be described, the processing of the second force values $Fx_{m,i}$ is the same.

The location processing module 27 analyses the first force values $Fy_{n,i}$ to determine whether the first force values $Fy_{n,i}$ include one or more candidate peaks $R_1, \ldots, R_{Kc}$, letting Kc denote a number of candidate peaks and $R_k$ denote the $k^{th}$ of Kc candidate peaks. An example of determining candidate peaks $R_k$ is further described with reference to FIG. 9. Each candidate peak $R_k$ corresponds to a local maximum in the first force values $Fy_{n,i}$, for example maximum $F^*_k$ which is equal to one of the first force values $Fy_{n,i}$, at a candidate location $y_k$ which is equal to one of the sensor locations $y_n$. For brevity, let $R_k=(y_k, F^*_k)$ denote the pair of values corresponding to the $k^{th}$ of Kc candidate peaks.

Where there is a need to distinguish between candidate peaks $R_k$ calculated for the first and second force values $Fy_{n,i}$, $Fx_{m,i}$, let the notation $Ry_k=(y_k, Fy^*_k)$ denote the $k^{th}$ of a number Kyc of candidate peaks determined for the first force values $Fy_{n,i}$. Similarly, let $Rx_k=(x_k, Fx^*_k)$ denote the $k^{th}$ of a number Kxc of candidate peaks determined for the second force values $Fx_{m,i}$.

Provided that at least one of the candidate peaks $R_k$ exceeds a minimum force threshold $F_{thresh}$, i.e. $F^*_k>F_{thresh}$, the first force values $Fy_{n,i}$ are interpolated to estimate interpolated force values G corresponding to coordinates y other than the first sensor locations $y_n$. Depending on the nature of interpolation used, the interpolated force values G may correspond to one or more continuous functions of position, for example G(y). Alternatively, the interpolated force values G may take the form of a number Nint of discrete values $G_1, \ldots, G_n, \ldots G_{Nint}$ corresponding to interpolated locations $yint_1, \ldots, yint_n, \ldots, yint_{Nint}$ which are more closely spaced than the original sensor locations $y_n$.

Where there is a need to distinguish between interpolated force values G for the first and second force values $Fy_{n,i}$, $Fx_{m,i}$, let Gy denote the interpolated force values for the first force values $Fy_{n,i}$, and let Gx denote the interpolated force values for the second force values $Fx_{m,i}$.

Location processing module 27 analyses the interpolated force values G and the candidate peaks $R_k$ to determine whether one or more peaks $H_1, \ldots, H_K$ is (or are) present, with K denoting a total number of peaks found and $H_k$ denoting the $k^{th}$ of K peaks. Each peak $H_k$ includes a peak coordinate $yp_k$ and a corresponding peak force value $Fp_k$. For brevity, let $H_k=\{yp_k, Fp_k\}$ denote the pair of values corresponding to the $k^{th}$ of K candidate peaks. In general, the number K of peaks may be less than or equal to the number Kc of candidate peaks.

Where there is a need to distinguish between peaks H for the first and second force values $Fy_{n,i}$, $Fx_{m,i}$, let $Hy_k=\{yp_k, Fyp_k\}$ denote the pair of values corresponding to the $k^{th}$ of Ky peaks determined for the first force values $Fy_{n,i}$, and let $Hx_k=(xp_k, Fxp_k)$ denote the pair of values corresponding to the $k^{th}$ of Kx peaks determined for the second force values $Fx_{m,i}$.

In general, the number of peaks determined from first and second force values $Fy_{n,i}$, $Fx_{m,i}$ should be identical, i.e. Kx=Ky. However, the ordering of peaks $Hy_k$, $Hx_k$ corresponding to the same user interaction may differ with respect to the index k.

Consequently, the location processing module 27 may be configured to match peak coordinates $yp_k$ estimated based on the first force values Fy $Fy_{n,i}$ with peak coordinates $xp_k$ estimated based on the second force values $Fx_{m,i}$ to obtain two-dimensional coordinates ($xp_k$, $yp_k$) for a particular user interaction. The matching is preferably based on the peak force values $Fyp_k$, $Fxp_k$ and/or on information about user interactions tracked since an earlier point of time.

The force channels 26 and the location processing module 27 may be implemented by a single device such as, for example, a micro-controller or an application specific integrated circuit. Alternatively, the force channels 26 and the location processing module 27 may be implemented using two or more devices such as micro-controllers, application specific integrated circuits and so forth. In some examples, the force signal processing module 15 and the front end module 14 may be integrated as a single device, for example a micro-controller, an application specific integrated circuit and so forth.

Method of calculating force values: Referring also to FIG. 7, a process flow diagram for a method of calculating force values $F_i$ from corresponding piezoelectric signals $P_i$, 18 is shown.

The method of calculating force values $F_i$ from corresponding piezoelectric signals $P_i$, 18 may be carried out by each force channel 26.

A piezoelectric signal $P_i$ is received (step S1). Optionally, a common mode value $P_{CM}$, obtained as an average of piezoelectric signals $P_i$ across all channels, may be subtracted from the piezoelectric signal $P_i$ at this stage. For example, the measurement front end 14 may measure and output the common mode value $P_{CM}$ to each of the force channels.

The received piezoelectric signal $P_i$ may be a piezoelectric signal $Py_{n,i}$ corresponding to a first electrode 5 or a piezoelectric signal $Px_{m,i}$ corresponding to a second electrode 6.

A corrected piezoelectric value $Pc_i=P_i-P_{off}$ is calculated by subtracting a first DC offset value $P_{off}$ from the piezoelectric signal $P_i$ (step S2). In some examples the first DC offset $P_{off}$ may be initialised by a calibration routine executed when a device (not shown) incorporating the touch panel 10 is powered on, woken from a sleep mode or is idle for an extended duration. In some examples, the first DC offset $P_{off}$ may be pre-calibrated. In either case, the first DC offset $P_{off}$ may be set based on an average value measured for the piezoelectric signal P(t) during a period in which there are no user interactions. This condition may be easier to confirm for the case of pre-calibration. However, if the optional capacitive signal processing module 16 is included, capacitance information 20 may be used to confirm the absence of user interactions for the purposes of initialising or re-calibrating the first DC offset.

The corrected piezoelectric value $Pc_i$ is compared against a piezoelectric signal threshold $P_{thresh}$ (step S3), for example, the condition $Pc_i > P_{thresh}$ may be tested. Alternatively and preferably, the condition $|Pc_i| > P_{thresh}$ may be tested. This condition roughly corresponds to testing whether or not the force channel is detecting a user interaction. Strictly, this condition tests whether an applied force is changing.

The piezoelectric signal threshold $P_{thresh}$ may be pre-calibrated, or may be calibrated by a routine executed when a device (not shown) incorporating the touch panel 10 is powered on, woken from a sleep mode or is idle for an extended duration. In some examples, the piezoelectric signal threshold $P_{thresh}$ may be set to a multiple of between 3 and 5 times a standard error measured for the piezoelectric signal $P_i$ during a period in which there are no user interactions. This condition may be easier to confirm for the case of pre-calibration. However, if the optional capacitive signal processing module 16 is included, capacitance information 20 may be used to confirm the absence of user interactions for the purpose calibrating the piezoelectric signal threshold $P_{thresh}$.

If the corrected piezoelectric value $Pc_i$ satisfies $|Pc_i| > P_{thresh}$, i.e. if a user interaction is occurring (step S3|Yes), then the force value $F_i$ for the force channel 26 is set equal to the sum of the corrected piezoelectric value $Pc_i$ and the previous force value $F_{i-1}$ (step S4). For example, the force value $F_i$ may be updated as $F_i = F_{i-1} + Pc_i$. The force value $F_i$ for each channel 26 may be initialised or re-initialised to zero when a device (not shown) incorporating the touch panel 10 is powered on, woken from a sleep mode or is idle for an extended duration. The force value $F_i$ for each channel 26 may also be re-initialised to zero when a particular event is detected such as, for example, detecting the end of a user interaction when the user removes an applied force, in response to being idle for an extended duration, and so forth.

If the corrected piezoelectric value $Pc_i$ does not satisfy $|Pc_i| > P_{thresh}$, i.e. if $|Pc_i| \leq P_{thresh}$ and a user interaction is not occurring (step S3|No), then the force value $F_i$ for the channel is set equal to the previous force value $F_{i-1}$ (step S5), i.e. $F_i = F_{i-1}$. This has the effect of holding the channel force value $F_i$ constant whilst the piezoelectric signal $P_i$ (or preferably its magnitude $|P_i|$) is below the piezoelectric signal threshold $P_{thresh}$.

A linear regression analysis is performed on a buffer $\{F_{i-Nbuff+1}, \ldots, F_{i-1}, F_i\}$ which stores the most recent channel force value $F_i$ and a number Nbuff–1 of previous channel force values $F_{i-Nbuff+1}, \ldots, F_{i-2}, F_{i-1}$ (step S6). For example, the force value $F_i$ is added to the front of a buffer $\{F_{i-Nbuff}, \ldots, F_{i-2}, F_{i-1}\}$ and displaces the oldest measurement $F_{i-Nbuff}$, and the regression analysis is then performed on the updated buffer $\{F_{i-Nbuff+1}, \ldots, F_{i-1}, F_i\}$. The regression analysis determines a gradient $\partial F/\partial t$, an offset $\delta F$ in the form of an average of the buffered force values $\{F_{i-Nbuff+1}, \ldots, F_{i-2}, F_{i-1}, F_i\}$, and a variance $\sigma^2_F$.

Alternatively, instead of storing force values $\{F_{i-Nbuff+1}, \ldots, F_{i-1}, F_i\}$, the buffer may store Nbuff previous values of the processed piezoelectric values $\{Pc_{i-Nbuff+1}, \ldots, Pc_{i-1}, Pc_i\}$, and the linear regression analysis (step S6) may be conducted on the values of the processed piezoelectric signal $Pc_i$ to determine a gradient $\partial Pc/\partial t$, offset $\delta Pc$, and variance $\sigma^2_{Pc}$ in terms of the processed piezoelectric signal Pc.

The gradient $\partial F/\partial t$ is compared against a pre-calibrated gradient threshold $\Delta F$ and the variance $\sigma^2_F$ is compared against a pre-calibrated variance threshold $\sigma^2_{thresh}$ (step S7). Both conditions $\partial F/\partial t < \Delta F$ and $\sigma^2_F < \sigma^2_{thresh}$ must be met. This situation is taken as corresponding to inactivity of the force channel 26.

The dual condition for inactivity may permit distinction of an idle period during which both the gradient $\partial F/\partial t$ and the variance $\sigma^2_F$ are low, from an active period during which a user interaction applies a relatively consistent force. The inventors have discovered that when a user attempts to apply a consistent force to the touch panel, although the gradient $\partial F/\partial t$ of the buffer $\{F_{i-Nbuff+1}, \ldots, F_{i-1}, F_i\}$ may be relatively low, the variance $\sigma^2_F$ of the buffer $\{F_{i-Nbuff+1}, \ldots, F_{i-1}, F_i\}$ remains relatively high. Without wishing to be bound by theory, it is speculated that the relatively high variance $\sigma^2_F$ during such periods may result from humans being unable to apply truly static force, resulting in continuous small changes in the applied force. The gradient threshold $\Delta F$ and the variance threshold $\sigma^2_{thresh}$ may be calibrated based on values of the gradient $\partial F/\partial t$ and the variance $\sigma^2_F$ obtained during a period in which there are no user interactions.

Alternatively, when the buffer stores corrected piezoelectric values $\{Pc_{i-Nbuff+1}, \ldots, Pc_{i-1}, Pc_i\}$ instead of force values $\{F_{i-Nbuff+1}, \ldots, F_{i-1}, F_i\}$, the test for inactivity (step S7) may be performed in terms of the corrected piezoelectric values $Pc_i$ by comparing the gradient $\partial Pc/\partial t$ against a pre-calibrated gradient threshold $\Delta P$ and comparing the variance $\sigma^2_{Pc}$ against a pre-calibrated variance threshold $\sigma p^2_{thresh}$.

If the buffer $\{F_{i-Nbuff+1}, \ldots, F_{i-1}, F_i\}$ is determined to correspond to an idle period (step S7|Yes), then a second DC offset value $F_{off}$ is updated to be equal to the offset $\partial F$ (step S8). Alternatively, when the buffer stores corrected piezoelectric values $\{Pc_{i-Nbuff+1}, \ldots, Pc_{i-1}, Pc_i\}$ instead of force values $\{F_{i-Nbuff+1}, \ldots, F_{i-1}, F_i\}$, then the second DC offset value $P_{off2}$ is expressed in terms of corrected piezoelectric values $Pc_i$ and is updated to be equal to the offset $\delta P$. The second DC offset value $F_{off}$, $P_{off2}$ is initialised to zero when a device (not shown) incorporating the touch panel 10 is powered on.

If the buffer $(F_{i-Nbuff+1}, \ldots, F_{i-1}, F_i)$ is determined to correspond to an active period (step S7|No), then the second DC offset value $F_{off}$, $P_{off2}$ is not updated.

A corrected force value $Fc_i$ is computed based on the force value $F_i$ and the second DC offset value $F_{off}$, $P_{off2}$, then output (step S9). For example, the corrected force value $Fc_i$ may be output to the location processing module 27. In this way, the calculation of corrected force values $Fc_i$ may take account of drift in the DC offset of each force channel 26 over time.

The corrected force value $Fc_i$ may be computed according to $Fc_i = F_i - F_{off}$, by subtracting the second DC offset in terms of force $F_{off}$ from the force value $F_i$.

Alternatively, when the buffer stores corrected piezoelectric values $\{Pc_{i-Nbuff+1}, \ldots, Pc_{i-1}, Pc_i\}$ instead of force values $\{F_{i-Nbuff+1}, \ldots, F_{i-1}, F_i\}$, the corrected force value $Fc_i$ may be computed according to $Fc_i = F_i - Nbff \times P_{off2}$, by subtracting the product of the buffer size Nbuff and the second DC offset in terms of corrected piezoelectric signal $P_{off2}$ from the force value $F_i$.

In a further alternative, the calculation of the corrected force value $Fc_i$ using the second DC offset in terms of corrected piezoelectric signal $P_{off2}$ may be carried out in a more robust way by:

Subtracting each buffered corrected piezoelectric signal value $\{Pc_{i-Nbuff+1}, \ldots, Pc_{i-1}, Pc_i\}$ which satisfies $|Pc_i| > P_{thresh}$ from the force value $F_i$; and Adding each buffered corrected piezoelectric signal value $\{Pc_{i-Nbuff+1}, \ldots, Pc_{i-1}, Pc_i\}$ which satisfies $|Pc_i - P_{off2}| > P_{thresh}$ to the force value $F_i$.

Whilst the touch panel 10 remains in use (step S10), the calculation repeats starting with reception of the next piezoelectric signal Pi+1 (step S1).

Although the method of calculating force values has been described in the context of the system 13 and in terms of providing corrected force values $Fc_i$ to the location processing module 27, the method of calculating force values described hereinbefore may be used in any piezoelectric touch panel in order to calculate corrected force values $Fc_i$ based on transient piezoelectric signal $P_i$ inputs. For example, the method of calculating force values may be used to calculate corrected force values $Fc_i$ for combined force and capacitance measurement devices as described in WO 2017/109455 A1 or WO 2016/102975 A2.

It will be appreciated that whilst the corrected force values $Fc_i$ are proportional to a force applied to the touch panel 10, conversion to an actual force value in Newtons (or equivalent units) requires use of one or more calibration coefficients. In general, force channels 26 corresponding to different sensor locations $y_n$, $x_m$, may experience different piezoelectric signal $P_i$, 18 magnitudes in response to identical forces applied directly over said sensor locations $y_n$, $x_m$. This results from bending behaviour of the touch panel 10 stack-up, in combination with the boundary conditions and/or support of the touch panel 10 within a device (not shown). Calibration coefficients may be determined in advance for each force channel 26, for example, by applying known forces at known locations on the touch panel 10. The force channels 26 may include such pre-calibrated geometric effects in the calculation of the output corrected force values $Fc_i$.

Alternatively, correction of force values $F_i$ for pre-calibrated geometric effects may be deferred to the location processing module 27. This may allow more precisely estimated peak coordinates $xp_k$, $yp_k$ to be used when determining which calibration coefficients to use.

Figure 8:
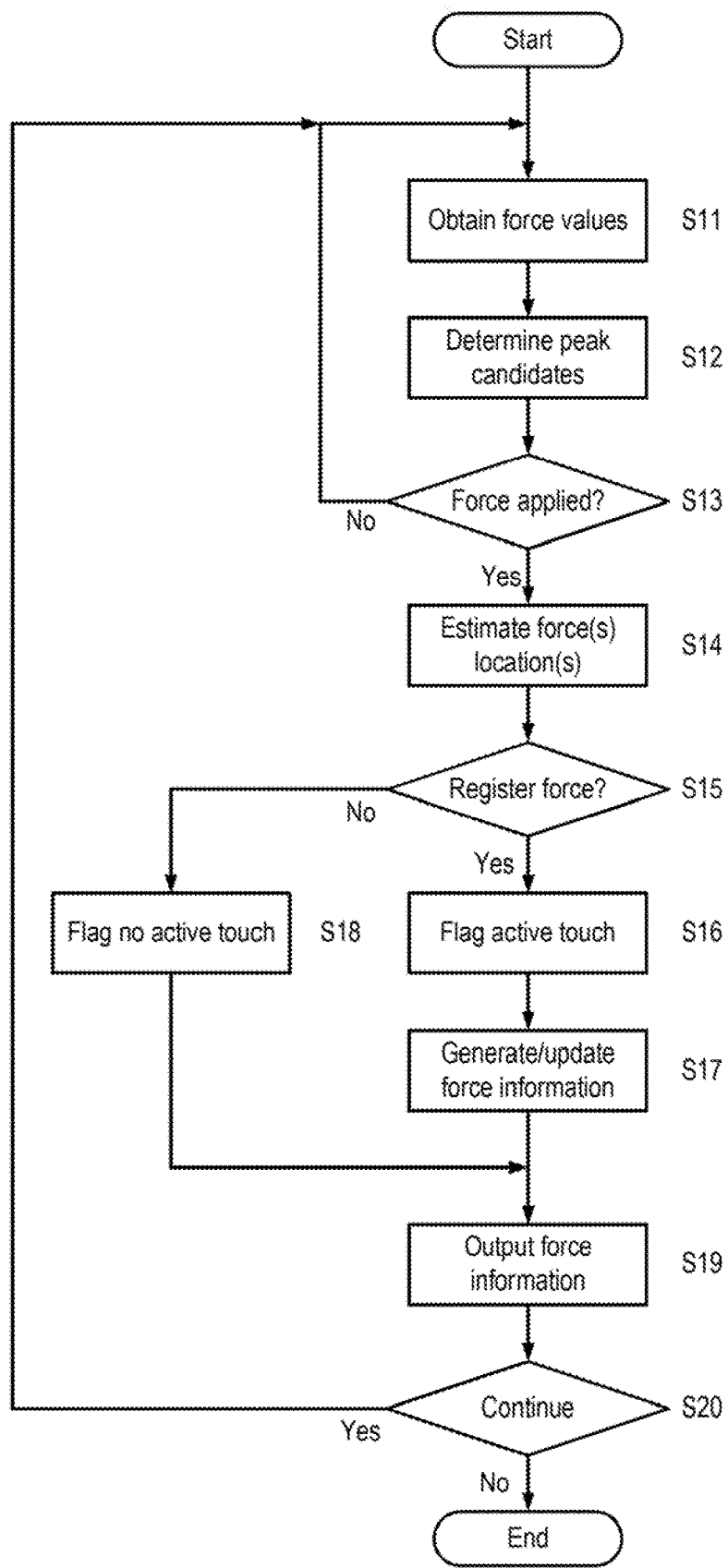
FIG. 8 is a process-flow diagram of a method of determining user interaction locations.

Method of determining user interaction locations: Referring also to FIG. 8, a process-flow diagram of a method of determining user interaction locations is shown.

The method of determining user interaction locations may be carried out based on force values $F_i$, $Fy_{n,i}$, $Fx_{m,i}$ which are corrected force values $Fc_i$ calculated according to the method of calculating force values described with reference to FIG. 7. However, this is not essential and the method of determining user interaction locations may be carried out based on force values $Fy_{n,i}$, $Fx_{m,i}$, $F_i$ or corrected force values $Fc_i$ calculated according to any suitable method. The method of determining user interaction locations will be described in the context of the location processing module 27. However, the method of determining user interaction locations may also be carried out by any suitable apparatus which receives force values $F_i$ corresponding to sensor locations $x_m$, $y_n$ spaced in one or more directions.

Force values $Fy_{1,i}, \ldots, Fy_{N,i}, Fx_{1,i}, Fx_{M,i}$ are received (step S11). Each force value $Fy_{n,i}$, $Fx_{m,i}$ corresponds to a sensor location $y_n$, $x_m$. For example, the force values $Fy_{1,i}, \ldots, Fy_{N,i}, Fx_{1,i}, \ldots Fx_{M,i}$ may be received from the first and second groups 28, 29 of force channels 26 of the system 13.

The force values $Fy_{1,i}, \ldots, Fy_{N,i}, Fx_{1,i}, \ldots, Fx_{M,i}$ are analysed to determine whether the force values $Fy_{1,i}, \ldots, Fy_{N,i}, Fx_{1,i}, \ldots Fx_{M,i}$ include one or more candidate peaks $R_k$ (step S12). Force values $Fy_{1,i}, \ldots, Fy_{N,i}$ corresponding to the first electrodes 5 are processed to determine a first set of Kyc candidate peaks $Ry_k = \{y_k, Fy^*_k\}$, and force values $Fx_{1,i}, \ldots Fx_{M,i}$ corresponding to the second electrodes 6 are processed to determine a second set of Kxc candidate peaks $Rx_k = \{x_k, Fx^*_k\}$. Any suitable peak-finding method may be used to determine candidate peaks $Ry_k$, $Rx_k$, and one example is further described hereinafter (see FIG. 9). The numbers of candidate peaks Kyc, Kxc may be zero, in other words, there are not necessarily any candidate peaks $Ry_k$, $Rx_k$.

In other words, the process of determining candidate peaks (step S12) corresponds to performing rough identification of the locations of one or more user interactions, with a precision equal to the spacing between sensor locations $x_m$, $y_n$.

The location processing module 27 tests whether any candidate peaks R exceed a minimum force threshold $F_{thresh}$ (step S13). Any candidate peaks $R_k$ which do not exceed the minimum force threshold are removed from the listing of candidate peaks $R_k$. The test is conducted separately for the first force values $Fy_{n,i}$ and second force values $Fx_{m,i}$, and different thresholds $Fy_{thresh}$ and $Fx_{thresh}$ may be used for the first force values $Fy_{n,i}$ and the second force values $Fx_{m,i}$, respectively. For example, the first candidate peaks $Ry_k$ may be tested according to the condition $Fy^*_k > Fy_{thresh}$, and the second candidate peaks $Rx_k$ may be tested according to the condition $Fx^*_k > Fx_{thresh}$.

When processing two-axis force data such as the first and second force values $Fy_{n,i}$, $Fx_{m,i}$, the location processing module 27 may enforce equal numbers Kyx, Kxc of candidate peaks $Ry_k$, $Rx_k$. For example, if there are either Kyc=0 first peaks $Ry_k$ or Kxc=0 second peaks $Rx_k$ after the removal of below threshold $F_{thresh}$, $Fy_{thresh}$, $Fx_{thresh}$ candidate peaks $Ry_k$, $Rx_k$ (step S13|No), then the method returns to obtain the next force values $Fy_{n,i+1}$, $Fx_{m,i+1}$ (step S11).

If there are different numbers Kyx, Kxc of candidate peaks $Ry_k$, $Rx_k$ after the removal of below threshold $F_{thresh}$, $Fy_{thresh}$, $Fx_{thresh}$ and candidate peaks $Ry_k$, $Rx_k$ (step S13|Yes), then the location processing module 27 may, in order from smallest to largest candidate peak value $Fp^*_k$, remove first or second candidate peaks $Ry_k$, $Rx_k$ as necessary until the numbers Kyx, Kxc of candidate peaks $Ry_k$, $Rx_k$ are equal Kyx=Kxc. For example, if there were Kyc=4 first candidate peaks $Ry_k$ which satisfy $Fy^* > Fy_{thresh}$, and Kxc=2 second candidate peaks $Rx_k$ which satisfy $Fx^*_k > Fx_{thresh}$, the location processing module 27 may remove the two first candidate peaks $Ry_k$ having the lowest candidate peak values $Fy^*_k$.

In some examples, each force channel 26 may have a separately calibrated minimum force threshold. For example, for the first candidate peaks $Ry_k = \{y_k, Fy^*_k\}$, each candidate peak value $Fy^*_k$ may be compared to a minimum force threshold $Fy_{thresh}(y_k)$ which is a function of the corresponding candidate location $y_k$. Similar position dependent minimum force threshold $Fx_{thresh}(x_k)$ may be employed for assessing the second candidate peaks $Rx_k = \{x_k, Fx^*_k\}$.

The threshold $F_{thresh}$ or position dependent thresholds $F_{thresh}(x_k)$, $F_{thresh}(y_k)$ may be determined from calibration experiments, for example, based on a multiple between three and five times a standard error measured for the corresponding force channel(s) during a period in which there are no user interactions.

If at least one candidate peak $R_k$ satisfies the minimum force condition (step S13|Yes), then interpolated force values G are determined based on the corresponding force values $F_i$, and it is estimated whether any peaks $H_k$ are present based on the interpolated force values G and the candidate peaks $R_k$ (step S14). The number K of peaks $H_k$ found may be less than or equal to the number Kc of input candidate peaks $R_k$, and it is possible for the number K of peaks $H_k$ to be zero. Each peak $H_k$ includes a peak coordinate $yp_k$, $xp_k$ and a corresponding peak force value $Fp_k$. In theory, the number K of peaks $H_k$, is limited only by the resolution (spacing) of the first and/or second electrodes 5, 6. In practice, the number K of peaks H may typically be one, two or three. For example, many common input gestures utilise a single digit or two digits. A larger number K of peaks $H_k$, for example four, five or more may indicate erroneous detections and may be factored into an estimate of the measurement quality.

Depending on the nature of interpolation used, the interpolated force values G may correspond to one or more continuous functions of position, for example G(y). Alternatively, the interpolated force values G may take the form of a number Nint of discrete values $G_1, \ldots, G_n, \ldots G_{Nint}$ a corresponding to interpolated locations $yint_1, \ldots, yint_n, \ldots, yint_{Nint}$ which are more closely spaced than the original sensor locations $y_n$.

When two-axis data such as the first and second force values $Fy_{n,i}$, $Fx_{m,i}$, are processed, the location processing module 17 may ensure equal numbers Kyc=Kxc>0 of first and second candidate peaks $Ry_k$, $Rx_k$ as described hereinbefore (step S13|Yes), before testing for any first peaks $Hy_k=\{yp_k, Fyp_k\}$ based on first interpolated force values $G_y$, and first candidate peaks $Ry_k$, and testing for any second peaks $Hx_k=\{xp_k, Fxp_k\}$ based on second interpolated force values Gx and second candidate peaks $Rx_k$.

Figure 11:
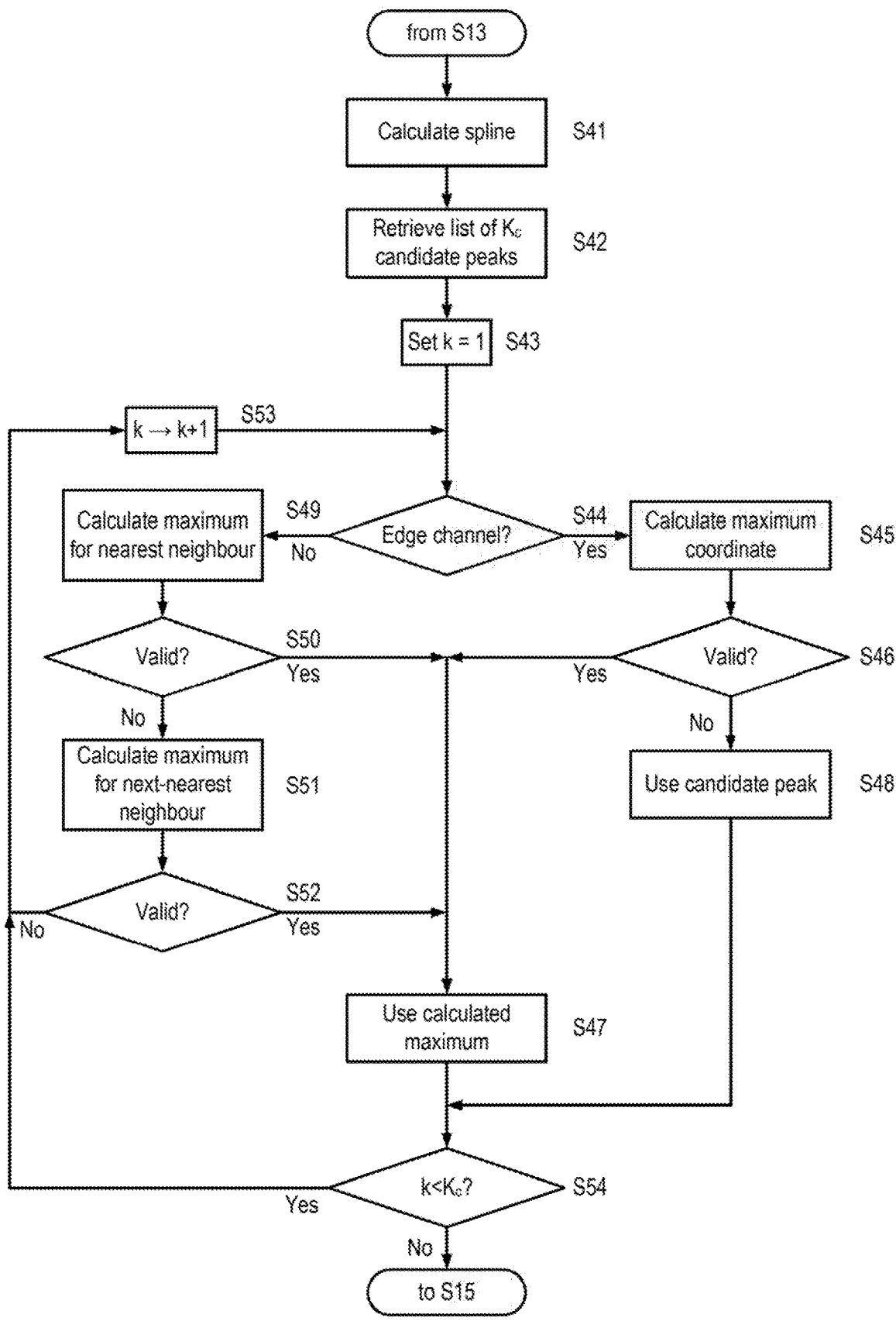
FIG. 11 is a process-flow diagram of a first method of interpolating force values and estimating peaks.

Determining interpolated force values G may be based on calculating a polynomial spline h(y) using the corresponding force values $F_i$. The polynomial spline h(y) is preferably a cubic spline. An example of determining interpolated force values G based on calculating a polynomial spline h(y) is further described hereinafter (FIG. 11).

Figure 13:
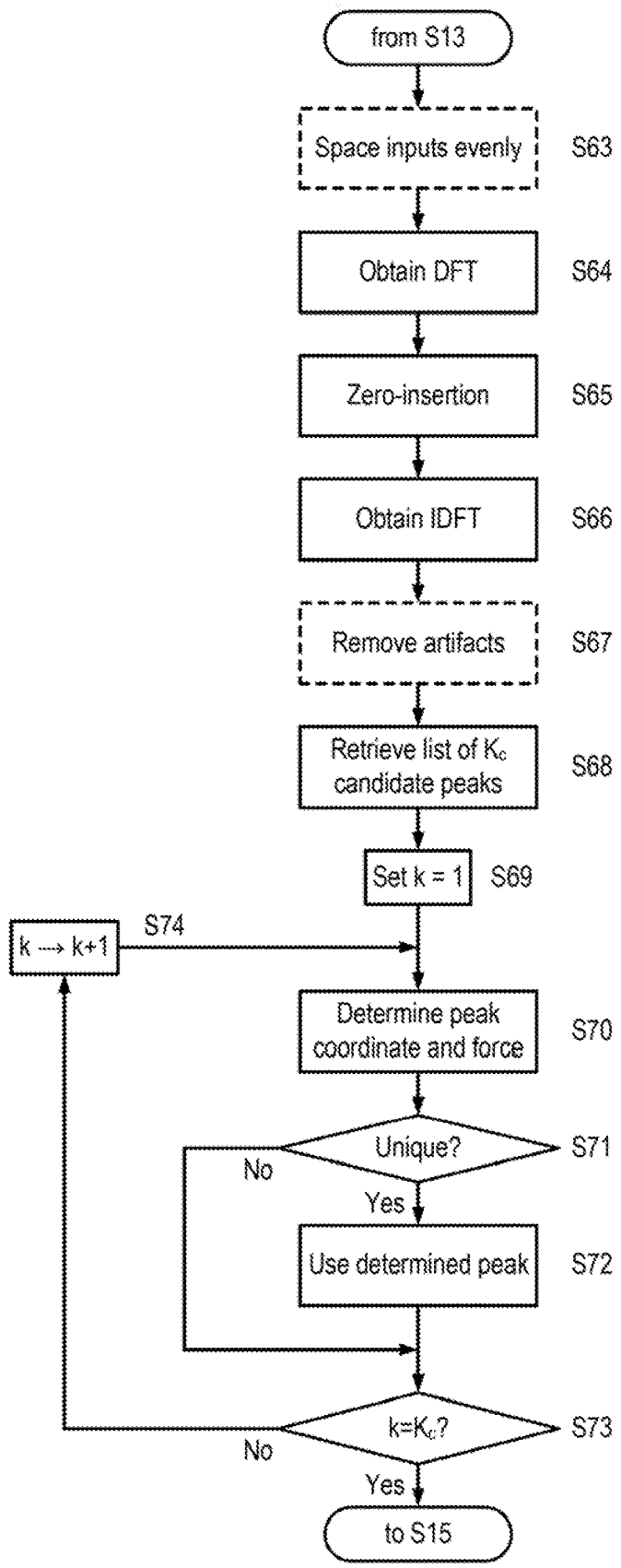
FIG. 13 is a process-flow diagram of a third method of interpolating force values and estimating peaks.

Alternatively, determining interpolated force values G may be based on applying Fourier transform methods to the corresponding force values $F_i$ (FIG. 13).

The location processing module 27 checks whether any estimated peaks H, $Hy_k$, $Hx_k$ correspond to a peak force $Fp_k$, $Fyp_k$, $Fxp_k$ which exceeds a registration threshold value $F_{reg}$ (step S15). The registration threshold $F_{reg}$ is larger than the minimum force threshold $F_{thresh}$ and has a different purpose. Whereas the minimum force threshold $F_{thresh}$ is calibrated to exclude noise in the input force values $F_i$, $Fy_{n,i}$, $Fx_{m,i}$, the registration threshold $F_{reg}$ is set to provide a minimum force, i.e. a minimum signal, before the system 13 registers a user interaction. The registration threshold $F_{reg}$ may be adjustable according to one or more of the intended use of a touch panel 10, user preferences, by an operating system or software being executed by a device (not shown) including the touch panel 10 receiving input from the system 13, and so forth. The registration threshold $F_{reg}$ may behave in a similar way to a "dead-zone" of a steering wheel, joystick or other type of controller peripheral for a computing device.

In some examples, to avoid sudden jumps in the input when the registration threshold $F_{reg}$ is exceeded, the location procession module 27 may subtract the registration threshold $F_{reg}$ from the peak forces $Fp_k$, $Fyp_k$, $Fxp_k$ prior to output.

Figure 10:
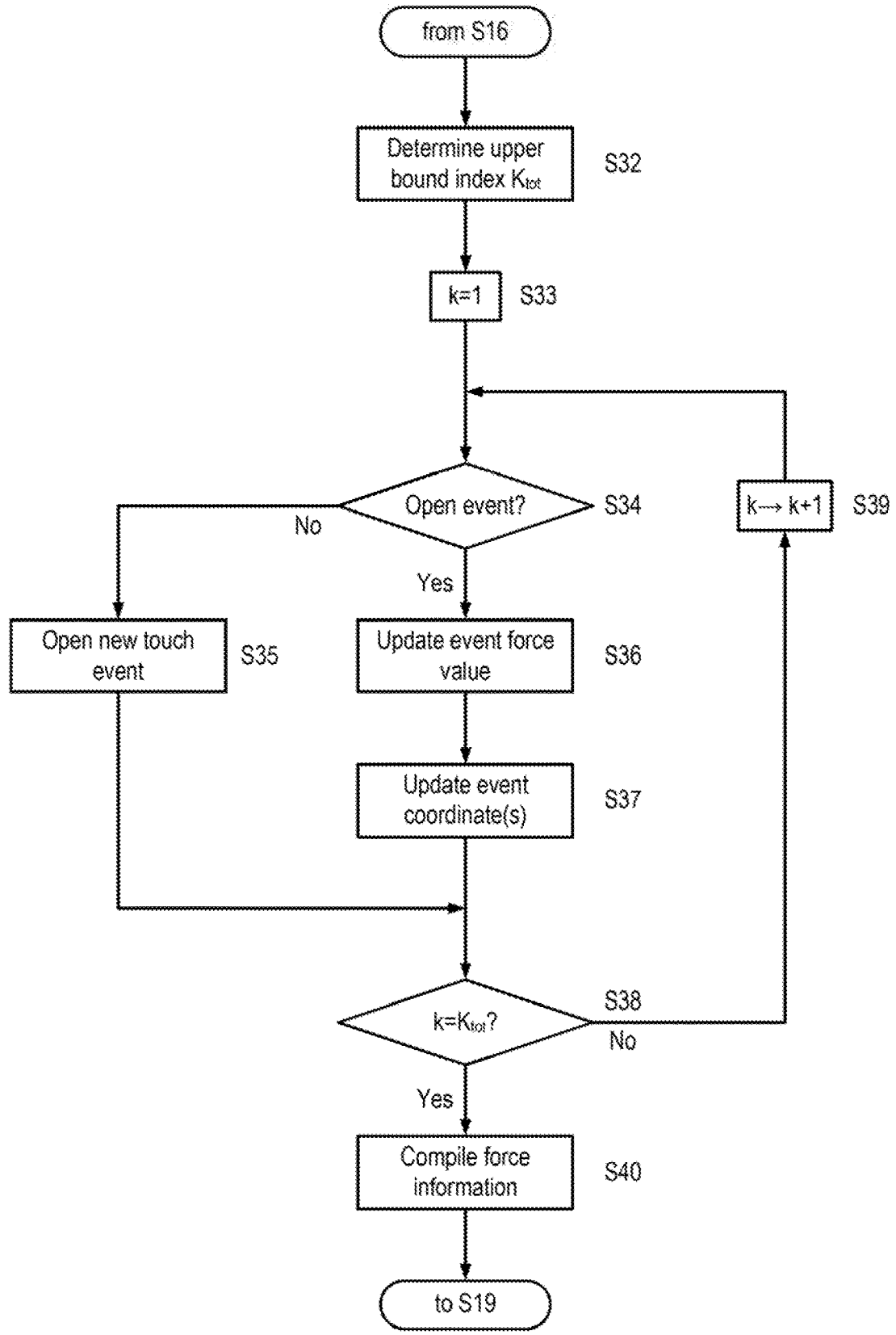
FIG. 10 is a process flow diagram of a method of generating and/or updating force information.

The location processing module 27 does not enforce equal numbers Ky, Kx of peaks $Hy_k$, $Hx_k$ at this stage (see S17 and FIG. 10).

Different registration thresholds $Fy_{reg}$ and $Fx_{reg}$ may be used for the first force values $Fy_{n,i}$ and the second force values $Fx_{m,i}$ respectively. For example, the first peaks $Hy_k$ may be tested according to the condition $Fyp_k > Fy_{reg}$, and the second candidate peaks $Rx_k$ may be tested according to the condition $Fxp_k > Fx_{reg}$. In some examples, each force channel 26 may have a separately adjustable registration threshold. For example, for the first peaks $Hy_k=\{yp_k, Fyp_k\}$, each candidate peak value $Fyp_k$ may be compared to a registration threshold $Fy_{reg}(yp_k)$ which is a function of the corresponding peak location $yp_k$. Similar position dependent registration thresholds $Fx_{reg}(xp_k)$ may be employed for assessing the second peaks $Hx_k=\{xp_k, Fxp_k\}$.

Position dependent registration thresholds $Fy_{reg}(y)$, $Fx_{reg}(x)$ may also be adjusted by an operating system or software receiving input from the system 13, for example, to specify two or more distinct input zones on the touch panel 10 surface, each of which may have a different registration threshold $F_{reg}$ set.

If at least one peak H, $Hy_k$, $Hx_k$ exceeds the registration threshold value(s) $F_{reg}$ (step S15|Yes), a global touch flag is set to a value of true (step S16) and force information 21 is generated or updated (step S17).

For single axis data, for example if only one set of force values $F_i$ is processed, the force information 21 may simply include the estimated peaks $H_k$ (step S17). Optionally, the location processing module 27 may attempt to assign each peak H to one or more active touch events $E_1, \ldots, E_j, \ldots, E_{Ne}$, with $E_j$ denoting the $j^{th}$ of Ne active touch events. The location processing module 27 may assign peaks $H_k$ to active touch events $E_j$ based on the proximity of the peak location $yp_k$, $xp_k$ to a previously measured coordinate $ye_j$, $xe_j$ of the touch event $E_j$. If the location processing module 27 is unable to assign a peak $H_x$ to an existing active touch event $E_j$, for example because the two are separated by excessive distance, then the location processing module 27 may open a new touch event $E_j$ to store the peak $H_k$. Similarly, if an existing active touch event $E_j$, does not have a peak $H_k$ assigned to it, then that event $E_j$ is deemed to have finished, and removed from a list of active events $E_j$.

Two-axis data, for example processing of first and second force values $Fy_{n,i}$, $Fx_{m,i}$, may simply be handled in the same way as single axis data.

However, in some examples the location processing module 27 preferably matches first peaks $Hy_k$ with corresponding second peaks $Hx_k$, for example to generate two-dimensional peaks $H2_k=\{(x2_k, y2_k), F2_k\}$, in which $y2_k$ is a first coordinate of the merged peak $H2_k$, $x2_k$ is a second coordinate of the merged peak $H2_k$ and $F2_k$ is an aggregate peak force for the merged peak $H2_k$, The first coordinate $y2_k$ may be set equal to the corresponding first peak coordinate $yp_k$. Alternatively, if the location processing module 27 assigns a pair of first and second peaks $Hy_k$, $Hx_k$ to an active event $E_j$, then the first coordinate $y2_k$ may be set equal to the an average of the first peak coordinate $yp_k$ and one or more previously stored event coordinates $ye_j$. The second coordinate $x2_k$ may be set in the same way as the first coordinate $y2_k$. The aggregate peak force $F2_k$ may be determined as an average, or weighted average, of the corresponding first and second peak forces $Fyp_k$, $Fxp_k$. Weighting coefficients may be pre-calibrated using known forces applied at known coordinates x, y. Weighting coefficients used to calculate an aggregate peak force $F2_k$ may depend on the coordinates $(x2_k, y2_k)$ of the merged peak $H2_k$.

Although under ideal conditions the number Ky of first peaks $Hy_k$ would be equal to the number Kx of second peaks $Hx_k$, in practice noise or other unexpected factors may result in unequal numbers Ky, Kx of first and second peaks $Hy_k$, $Hx_k$. The location processing module 27 may optionally enforce equal Ky=Kx numbers of first and second peaks $Hy_k$, $Hx_k$ when matching the merged peaks $H2_k$ to active touch events $E_j$ and generating merged peaks $H2_k$.

For example, if the number Ky of first peaks $Hy_k$ is Ky=4 and the number Kx of second peaks $Hx_k$ is Kx=2, then the location processing module 27 may start discarding first peaks $Hy_k$, in order from lowest to highest peak value $Fyp_k$, until only two first peaks $Hy_k$ remain. The remaining Ky=2 first peaks $Hy_k$ and Kx=2 second peaks $Hx_k$ may be matched to generate merged 2D peaks $H2_k$, and checked for assignment to active touch events $E_j$. One option for matching first and second peaks $Hy_k$, $Hx_k$ may be based on relative peak force values $Fyp_k$, $Fxp_k$. For example, if four peaks are $Hy_1=\{yp_1, Fyp_1\}$, $Hy_2=\{yp_2, Fyp_2\}$, $Hx_1=\{xp_1, Fxp_1\}$, $Hx_2=\{xp_2, Fxp_2\}$, then if $Fyp_1>Fyp_2$ and $Fp_1<Fxp_2$, then a first 2D peak $H2_1$ would be formed by merging $Hy_1$ and $Hx_2$ and a second 2D peak $H2_2$ would be formed by merging $Hy_2$ and $Hx_1$.

Alternatively, if the number $K_y$ of first peaks $Hy_k$ is Ky=4 and the number Kx of second peaks $Hx_k$ is Kx=2, then the location processing module 27 may compare each of the first and second peaks $Hy_k$, $Hx_k$ against coordinates $(xe_j, ye_j)$ of the active touch events $E_j$, in order to determine which of the first and second peaks $Hy_k$, $Hx_k$ correspond to tracked events $E_j$. Any surplus peaks $Hy_k$, $Hx_k$ may be discarded. When two peaks, for example two first peaks $Hy_k$ are both within a predetermined distance of a tracked event $E_j$, the location processing module 27 may select the larger peak $Hy_k$.

By basing matching of two or more pairs of peaks $Hy_k$, $Hx_k$ on comparisons with tracked events $E_j$, ambiguity of touch locations may be avoided. For example, although a user may consider that they are touching two fingers to a touch panel 10 simultaneously, at the scan rate of the touch panel 10 the contact times of the two fingers are likely to be separated by at least one sampling interval. The rates of increasing the applied force may also be dissimilar. By comparing peaks $Hy_k$, $Hx_k$ with tracked events $E_j$, an initial touch will open a first event $E_1$, and when the second touch is registered, the event $E_1$ will match with a first peak $Hy_k$ and a second peak $Hx_k$, leaving a single pair of first and second peaks $Hy_k$, $Hx_k$ to match with one another. This approach may clearly be extended to third or further touch events (although as already noted, more than three user concurrent user interactions may be uncommon).

Further examples of matching first and second peaks are outlined with reference to FIG. 10.

If no peaks H, $Hy_k$, $Hx_k$ exceed the registration threshold value(s) $F_{reg}$ (step S15|No), the global touch flag is set to a value of false (step S18). Any currently tracked touch events $E_j$ may also by reset/removed in response to the global touch flag being set to false. In some examples, some or all of the channel 26 force values $Fy_{n,i}$, $Fx_{m,i}$, may also be reset to zero in response to the global touch flag being set to false.

The force information 21 is output (step S19). The force information 21 may include peaks $H_k$, $Hy_k$, $Hx_k$, merged peaks $H2_k$ and/or active touch events $E_j$. The force information 21 may be output to one or more processors of a device (not shown) incorporating the touch panel 10 or using the touch panel 10 as a peripheral.

Whilst the system 13 remains active (step S20|Yes), the subsequent force values $F_{i+1}$, $Fy_{n,i+1}$, $Fx_{m,i+1}$ are obtained (step S11).

Although the method of determining user interaction locations has been explained primarily with reference to 2-axis data obtained from first and second groups 28, 29 of force channels 26, the method is equally applicable to any sets of 2-axis force values.

In some examples, only a single axis of force measurement may be used, and the method of determining user interaction locations is equally applicable to such examples. For instance, the force signal processing module 15 may obtain piezoelectric signals 18 corresponding to only the first electrodes 5 or only the second electrodes 6, providing a single axis of force sensing. Such an example may be used for a slider control, or in combination with two-dimensional capacitance sensing in a system 13 which includes a capacitance signal processing module 16.

Figure 9:
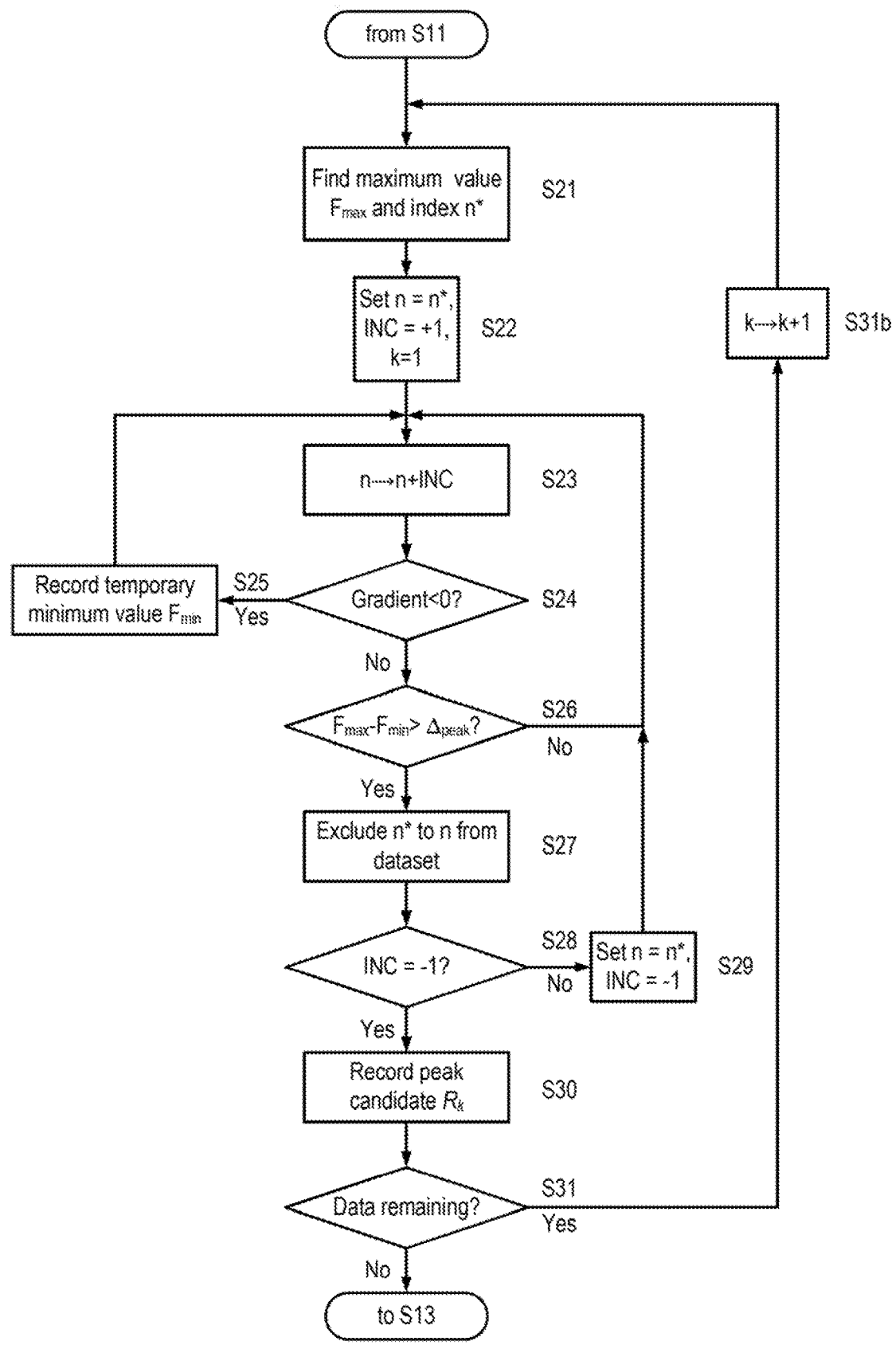
FIG. 9 is a process flow diagram of a method of determining a number of candidate peaks.

Example of determining candidate peaks: Referring also to FIG. 9, a process flow diagram for an exemplary method of determining a number of candidate peaks $R_k$, $Ry_k$, $Rx_k$ is shown (step S12). However, the method of determining user interaction locations (step S12) may employ any suitable alternative methods for determining candidate peaks.

The method of determining a number of candidate peaks $Ry_k$ is described in relation to first force values $Fy_{n,i}$. However, the method of determining a number of candidate peaks may be applied identically to the second force values $Fx_{m,i}$, or any other set of force values $F_i$ which correspond to sensor locations spaced along a direction.

The set of first force values $\{Fy_{1,i}, \ldots, Fy_{n,i}, \ldots, Fy_{N,i}\}$ is searched to find the maximum value, which is stored to a temporary variable $F_{max}$, and the corresponding index n is stored to a temporary variable n*, where $1 \le n^* \le N$ (step S21). The maximum value $F_{max}$ and the maximum index n* are temporary variables which are internal to the method of determining a number of candidate peaks $Ry_k$.

An index n is initialised to the maximum index n*, an increment variable INC is initialised to a value of +1, and a peak candidate counter k is set to a value of one (step S22).

The index n is incremented to a new value by addition of the increment variable INC (step S23). The overall effect of steps S22 and S23 is simply to start scanning the first force values $\{Fy_{1,i}, \ldots, Fy_{n,i}, \ldots, Fy_{N,i}\}$ from the location of the maximum value $F_{max}$.

The spatial gradient $\partial Fy/\partial y$ of the first force values $\{Fy_{1,i}, \ldots, Fy_{n,i}, \ldots, Fy_{N,i}\}$ is determined for the $n^{th}$ of N first force values $Fy_{n,i}$, and the sign of the gradient $\partial Fy/\partial y$ is determined (step S24). The spatial gradient $\partial Fy/\partial y$ may be determined using any suitable numerical measure of gradient such as, for example, a forward difference gradient, a backward difference gradient or a central difference gradient. The calculation of the $\partial Fy/\partial y$ may take account of the sensor locations $y_n$. However, since only the sign of the gradient $\partial Fy/\partial y$ is needed, the sensor locations $y_n$ may be omitted from the gradient $\partial Fy/\partial y$ calculations.

If the gradient $\partial Fy/\partial y$ is negative (step S24|Yes), the first force value $Fy_{n,i}$, corresponding to the current index n is stored to another temporary variable $F_{min}$ (step S25). The minimum force value $F_{min}$ keeps track of the lowest first force value $Fy_{n,i}$ seen when scanning away from the maximum force value $F_{max}$. The new value of $F_{min}$ overwrites any already stored value. The index n is incremented again (step S23) and the gradient $\partial Fy/\partial y$ condition re-tested (step S24).

If the gradient $\partial Fy/\partial y$ is zero or positive (step S24|No), the difference between the currently stored maximum and minimum force values $F_{max}-F_{min}$ is compared against a peak shift threshold $\Delta_{peak}$ (step S26). This condition is applied in order to reduce the possibility of noise on the falling edge of a peak being falsely registered as a minimum.

If the difference $F_{max}-F_{min}$ is less than or equal to the peak shift threshold $\Delta_{peak}$ (step S26|No), then a minimum between two peaks has not been found, and the index n is incremented (step S23).

If the difference $F_{max}-F_{min}$ more than the peak shift threshold $\Delta_{peak}$ (step S26|Yes), then a minimum between two peaks has been found, and the first force values $Fy_{n,i}$ corresponding to the index values between and including the maximum index n* and the current index n are excluded from further consideration by the method of determining a number of candidate peaks (step S27). For example, the excluded (already analysed) first force values $Fy_{n,i}$ may be removed from the set of first force values $\{Fy_{1,i}, \ldots, Fy_{N,i}\}$. Alternatively, a mask vector of length N may be maintained, holding a value of true (unity) for first force values $Fy_{n,i}$ which are not excluded and a value of false (zero) for excluded first force values $Fy_{n,i}$. Any other suitable method of tracking the excluded/non-excluded first force values $Fy_{n,i}$ may be used.

In some examples, the force values $Fx_{n,i}$ corresponding to the range between and including n* to n-INC may alternatively be excluded from further consideration, so that the $n^{th}$ force value $Fx_{i,n}$ is not excluded in step S27.

The value of the increment variable INC is checked for the equality INC=-1 (step S28). Since the increment variable INC is initialised to +1, this condition corresponds to checking whether the gradient scanning (steps S23 to S27) has been carried out in both directions away from the maximum index n*.

If the increment variable INC does not equal -1 (step S28|No) then the increment variable INC is set to INC=-1 and the minima finding loop (steps S23 to S27) is repeated moving in the other direction (step S29).

If the increment variable INC satisfies INC=-1 (step S28|Yes) then the minima finding loop in both directions is completed, and a peak candidate $Ry_k=\{y_k, Fy^*_k\}$ is assigned with candidate location $y_k=y_{n^*}$ and candidate peak value $Fy^*_k=F_{max}$ (step S30).

If there is any remaining non-excluded data (step S31|Yes), the candidate peak counter k is incremented to k+1 (step S31a) and the maximum value of the remaining non-excluded first force values $Fy_{n,i}$ is found (step S21).

If all data has been excluded (step S31|No), the candidate peaks $Ry_k$ are output, and the number Kyc of candidate peaks $Ry_k$ is set as the current value of the counter k.

Although not shown in FIG. 9 for visual clarity, it will be appreciated that if the index n is incremented (step S23) to a value of n>N or n<1, the method will move directly to step S28.

Method of generating and/or updating force information: Referring also to FIG. 10, a process flow diagram is shown for an exemplary method of generating and/or updating force information 21 (step S17). However, the method of generating and/or updating force information 21 (step S17) may employ any suitable alternative methods for generating and/or updating force information 21.

An upper bound index value $K_{tot}$ is determined (step S32). For single axis data $H_k$, the upper bound index value $K_{tot}$ is set equal to the number K of peaks $H_k$, $K_{tot}=K$.

When first and second peaks $Hy_k$, $Hx_k$ are processed, the upper bound index value $K_{tot}$ is set to the smaller of the numbers Ky, Kx, i.e. $K_{tot}=\min\{Ky, Kx\}$. Additionally, whichever of the first and second peaks $Hy_k$, $Hx_k$ has the lower number Ky, Kx is flagged as a primary peak set. For example, if Ky=2 and Kx=3, then the first peaks $Hy_k$ will be flagged as the primary peaks and the second peaks $Hx_k$ as the secondary peaks. This is because the less numerous peak set is less likely to contain an erroneous/false peak.

The remainder of the method of generating and/or updating force information 21 shall be explained on the assumption that the first peaks $Hy_k$ are the primary peak set for two-axis data. However, the method is equivalent if the second peaks $Hx_k$ were the primary peak set.

Index k is initialised to k=1 (step S33).

The $k^{th}$ of $K_{tot}$ peaks $H_k$ is checked against zero or more active touch events $E_j$, to determine whether the peak $H_k$ corresponds to an already active touch event $E_j$ (step S34).

As previously defined, $E_j$ denotes the $j^{th}$ of Ne active touch events, and is associated with stored coordinate $ye_j$ (or $xe_j$) for single axis data, or coordinate ($xe_j$, $ye_j$) for two axis data. For the purposes of explaining the method of generating and/or updating force information 21, it shall be helpful to define further properties for each active touch event $E_j$. In particular, active touch events E may be tracked as a function of time $E_j(t)$, letting $E_j(t_i)$ be denoted as $E_{j,i}$ and $E_j(t_i+\delta t)$ be denoted as $E_{j,i+1}$ and so forth. Similarly, the coordinates of event $E_j$ at time $t_i$ may be denoted $(xe_{j,i}, ye_{j,i})$ and so forth.

Each active touch event may be denoted as $E_{j,i}=\{Fe_{j,i}, (xe_j, ye_j), Cbuff_j\}$ with $Fe_{j,i}$ denoting the force value associated with the $j^{th}$ active touch event $E_j$ at time $t_i$ and $Cbuff_j=\{(xe_{j,i}, ye_{j,i}) \ldots, (xe_{j,i-Nbuff2+1}, ye_{j,i-Nbuff2+1})\}$ being a coordinate buffer storing the current coordinate $(xe_{j,i}, ye_{j,i})$ of the $j^{th}$ active touch event $E_j$ and Nbuff2-1 previous coordinates. For single axis data, only values $ye_{j,i}$ or $xe_{j,i}$ will be stored by coordinate buffer $Cbuff_j$. The coordinate buffer $Cbuff_j$ may be omitted in some examples.

Consequently, when $k^{th}$ of $K_{tot}$ peaks $H_k$ is checked against zero or more active touch events $E_j$, the check is made against the active touch events from time $t_i-\delta t$, i.e. $H_k$ is tested against $E_{j,i-1}$.

For example, the absolute distance between the peak coordinate $yp_k$ of the $k^{th}$ peak $H_k$ and the most recent coordinate $ye_{j,i-1}$ may be checked for each of Ne active touch events $E_{j,i-1}$. Denoting the distance between the $k^{th}$ peak and $j_{th}$ active touch event as $d_j$, then for single axis data $d_j=|yp_k-ye_{j,i-1}|$. If the distance $d_j$ is less than an association threshold $d_{assoc}$, then the $k^{th}$ peak $H_k$ is assigned as corresponding to the $j^{th}$ active touch event. Only one peak $H_k$ may be assigned to an active touch event at each time $t_i$. The association threshold $d_{assoc}$ may be set or determined during calibrations of a touch panel, and will in general depend on factors including but not limited to the pitch or separation between electrodes, the mechanical support conditions and so forth. The association threshold $d_{assoc}$ may be set based on a typical width, or centre-to-centre distance, for a pair of fingers alongside one another, for example, $d_{assoc}=20$ mm.

If two or more distances $d_j$ are less than the association threshold $d_{assoc}$, then the $k^{th}$ peak is assigned to the closest, i.e. the active touch event $E_{j,i-1}$ having the lowest value of $d_j$. Alternatively in a case where two or more distances $d_j$ are less than the association threshold $d_{assoc}$, the $k^{th}$ peak may instead be assigned to the active touch event $E_{j,i-1}$ having the event force value $Fe_{j,i}$ closest in value to the peak force $Fp_k$. In other examples, a combination of distances $d_j$ and relative force values $Fe_{j,i}$, $Fp_k$ may be used to resolve ambiguities when two or more distances $d_j$ are less than the association threshold $d_{assoc}$.

If all of the distances $d_j$ are greater than or equal to the association threshold $d_{assoc}$, then the $k^{th}$ peak is not assigned to any active touch event $E_j$ (step S34|no). Similarly, if the $k^{th}$ peak cannot be assigned to an active touch event because all touch events $E_j$ have already been assigned to other peaks H, then the $k^{th}$ peak is not assigned to any active touch event $E_j$ (step S34|no).

For two-axis data, checking associations with active touch events E also includes the process of matching first and second peaks $Hy_k$, $Hx_k$ to form pairs corresponding to a two-dimensional coordinate of a user interaction.

In a first stage, the $k^{th}$ primary peak $Hy_k$ is checked against the active touch events $E_{j,i-1}$ in exactly the same way as for single-axis data.

If the $k^{th}$ primary peak $Hy_k$ is matched against the $j^{th}$ active touch event $E_{j,i-1}$, then all of the Kx secondary peaks $Hx_{k2}$ (k2 is an index 1≤k2≤Kx) are checked for matching against the $j^{th}$ active touch event $E_{j,i+1}$. If a matching secondary peak $Hx_{k2}$ is found, then the $k^{th}$ primary peak $Hy_k$ and $k2^{th}$ secondary peak $Hx_{k2}$ are assigned to the $j^{th}$ active touch event $E_{j,i-1}$ (step S34|yes). Optionally, the $k^{th}$ primary peak $Hy_k$ and $k2^{th}$ secondary peak $Hx_{k2}$ may be merged into a 2D peak $H2_k$. Only one primary peak $Hy_k$ and one secondary peak $Hx_k$ may be assigned to each touch event $E_{j,i-1}$.

Optionally, a ratio $|Fyp_k-Fxp_{k2}|$ may also be tested against a pre-calibrated threshold or against a fraction of the primary peak force value $Fyp_k$, and the secondary peak $Hx_{k2}$ may be assigned as matching only if the difference $|Fyp_k-Fxp_{k2}|$ is sufficiently low.

If a matching secondary peak $Hx_{k2}$ is not found, then despite the $k^{th}$ primary peak $Hy_k$ matching an active touch event $E_{j,i-1}$, no assignment is made (step S34|No).

If the $k^{th}$ primary peak $Hy_k$ does not match any active events $E_j$, then no assignment is made (step S34|No).

If the $k^{th}$ peak $H_k$ (or $k^{th}$ primary peak $Hy_k$) is not assigned to an active touch event $E_{j,i-1}$ (step S34|No) then a new touch event $E_{j,i}$ is opened and populated (step S35). For example, the number Ne of events is incremented by one, and the $Ne+1^{th}$ event $E_{Ne+1,i}$ is populated setting the event force value equal to the peak force value as $Fe_{Ne+1,i}=Fp_k$, and adding the peak coordinate to the coordinate buffer $Cbuff_{Ne+1}=\{yp_k\}$.

When two-axis data is being processed, the $k^{th}$ primary peak $Hy_k$ needs to be matched to a secondary peak $Hx_k$ before opening the new event $E_{N+1-i}$. Using the index k2 again to denote the $k2^{th}$ of Kx secondary peaks $Hx_{k2}$, a peak difference value $pd_{k2}=|Fyp_k-Fxp_{k2}|$ is calculated between the $k^{th}$ primary peak $Hy_k$ and each secondary peak $Hx_{k2}$. The $k2^{th}$ secondary peak $Hx_{k2}$ having the smallest peak difference value $pd_{k2}$ is matched to the $k^{th}$ primary peak $Hy_k$. The $k2^{th}$ secondary peak $Hx_{k2}$ is removed from the set of secondary peaks Hx available for matching with the primary peaks Hy.

Optionally, the calculation of peak difference values $pd_{k2}$ may be weighted to account for geometry and boundary condition derived differences in responsivities of the first and second electrodes force values $Fy_{n,i}$, $Fx_{m,i}$. For example, peak difference values $pd_{k2}$ may be calculated according to $pd_{k2}=|\alpha Fyp_k-\beta Fx_{k2}|$. The coefficients α and β may adjust the force values to be proportional to actual force applied to the touch panel 10, and may be pre-calibrated using known forces applied at known locations. In some examples, the weighting coefficients α, β may be functions of peak coordinates, for example peak difference values $pd_{k2}$ may be calculated according to $pd_{k2}=|\alpha(yp_k)Fyp_k-\beta(xp_{k2})Fxp_{k2}|$. Using weighted peak difference values $pd_{k2}$ may enable a more reliable comparison of the relative heights of first and second peak force values $Fyp_k$, $Fxp_{k2}$.

Once a pairing of the $k^{th}$ primary peak $Hy_k$ with a $k2^{th}$ secondary peak $Hx_{k2}$, is established, the $Ne+1^{th}$ event $E_{Ne+1,i}$ may be populated by setting the event coordinate equal to the peak coordinate $ye_{j,i}=yp_k$, setting the event force value equal to the average of the peak force values as $Fe_{Ne+1,i}=0.5\times(Fyp_k+Fxp_{k2})$, and when the coordinate buffer is used, adding the first and second peak coordinates to the coordinate buffer $Cbuff_{Ne+1}=\{(xp_{k2},yp_k)\}$.

Optionally, the event force value $Fe_{N+1,i}$ may be calculated using the weighting coefficients α, β, according to $Fe_{N+1,i}=0.5\times(\alpha Fyp_k+\beta Fxp_{k2})$. In some examples, the weighting coefficients α, β may be functions of peak coordinates $yp_k$, $xp_k$, and the event force value $Fe_{N+1,i}$ may be calculated as $Fe_{N+1,i}=0.5\times(\alpha(yp_k)Fyp_k+\beta(xp_{k2})Fxp_{k2})$.

If the $k^{th}$ peak $H_k$ (or $k^{th}$ primary peak $Hy_k$ and $k^{th}$ secondary peak $Hx_{k2}$) is assigned to the $j^{th}$ active touch event $E_{j,i-1}$ (step S34|Yes), the event force value $Fe_{j,i}$ is updated (step S36). For single-axis data, the force value $Fe_{j,i}$ of the $j^{th}$ active touch event $E_{j,i}$ is assigned as the k peak force value $Fe_{j,i}=Fp_k$.

For two-axis data, the event force value $Fe_{j,i}$ is set equal to the average of the $k^{th}$ first peak force value $Fyp_k$ and $k2^{th}$ second peak force value $Fxp_{k2}$ peak force value, according to $Fe_{j,i}=0.5\times(Fyp_k+Fxp_{k2})$. Optionally, the event force value $Fe_{j,i}$ may be calculated using the weighting coefficients α, β, as to $Fe_{j,i}=0.5\times(\alpha Fyp_k+\beta Fxp_{k2})$. In some examples, the weighting coefficients α, β may be functions of peak coordinates, and the event force value $Fe_{j,i}$ may be calculated as $Fe_{j,i}=0.5\times(\alpha(yp_k)Fyp_k+\beta(xp_{k2})Fxp_{k2})$.

The event coordinate $(xe_{j,i}, ye_{j,i})$ is updated (step S37). For single axis data, the $k^{th}$ peak coordinate y is added to the coordinate buffer $Cbuff_j$. If the coordinate buffer $Cbuff_j$ is full, then the oldest coordinate $ye_{j,i-Nbuff2+1}$ is displaced. The event coordinate $ye_{j,i}$ is set equal to an average of the Nbuff2 coordinates stored in the coordinate buffer $Cbuff_j$. In some examples, the coordinate buffer $Cbuff_j$ may store a single previous value, Nbuff2=1.

In other examples, instead of an average over the coordinate buffer, the event coordinate $ye_{j,i}$ may be set according to:

$$ye_{j,i} = \sum_{f=1}^{Nbuff2} C_f \times ye_{j,i-f+1}$$

In which f is an index and the $C_f$ are weighing coefficients, wherein a sum over the weighing coefficients $C_f$ evaluates to unity. The values of $C_f$ generally decrease with increasing value of the index f, for example reciprocally or exponentially with f. In this way, the more recent coordinates may contribute more significantly to the event coordinate $ey_{j,i}$ than the older coordinates.

Using the coordinate buffer $Cbuff_j$ in this way may be helpful because changes in the calculated peak coordinates $yp_k$, $xp_{k2}$ between sampling intervals $t_i$, $t_i+\delta t$ may be smoothed out, avoiding "jittering" of the user interaction location.

In other examples, the coordinate buffer $Cbuff_j$ may not be used, and the event coordinate $ye_{j,i}$ may simply be set equal to the $k^{th}$ peak coordinate $yp_k$.

The processing for two-axis data is the same, except that all the coordinates involved are two-dimensional vectors.

If the index k is not equal to the upper bound index $K_{tot}$ (step S38|No), the index value is incremented (step S39) and the touch event $E_j$ generating or updating process is repeated (steps S34 to S37).

If the index k is not equal to the upper bound index $K_{tot}$ (step S38|No), the force information 20 is compiled (step S40). Any events $E_j$ which have not been assigned a peak $H_k$ (or a pair of first and second peaks $Hy_k$, $Hx_k$) are removed from the listing of events $E_j$. For two-axis data, any unmatched secondary peaks $Hx_k$ may also be removed. The force information 21 is compiled, and includes the updated and/or newly created active touch events $E_{j,i}$. Optionally, the force information 21 may also include the peaks $H_k$, $Hy_k$, $Hx_k$ and/or the received force values $Fy_{n,i}$, $Fy_{m,i}$.

Method using polynomial splines: Referring also to FIG. 11, a process-flow diagram of a first exemplary method of interpolating force values and estimating peaks H is shown (step S14). However, the method of interpolating force values and estimating peaks H (step S14) may employ any suitable alternative methods for generating and/or updating force information 21.

The first method of interpolating force values and estimating peaks H will be explained with reference to the first force values $Fy_{n,i}$ and the corresponding sensor locations $y_n$ and candidate peaks $Ry_k=\{y_k, Fy^*_k\}$. However, the first method of interpolating force values and estimating peaks H is equally applicable to the second force values $Fx_{m,i}$, or any other set of force values $F_i$ corresponding to sensor locations spaced apart along a direction.

A polynomial spline h(y) is calculated for the force values $Fy_{n,i}$ and corresponding sensor locations $y_n$ (step S41). The interpolated force values G(y) are equivalent to the polynomial spline G(y)=h(y). The polynomial spline h(y) is composed of a number N−1 of spline segments $h_n(y)$. The $n^{th}$ of N−1 spline segments $h_n(y)$ connects the $n^{th}$ force value $Fy_{n,i}$ at the $n^{th}$ sensor location $y_n$ to the n+1$^{th}$ force value $Fy_{n+1,i}$ at the n+1$^{th}$ sensor location $y_{n+1}$. Calculation of the polynomial spline h(y) is conventional, with continuity enforced between adjacent spline segments $h_n(y)$ and $h_{n+1}(y)$ and, depending on the degree of the polynomial spline, also enforcing continuity of one or more derivatives of the adjacent spline segments $h_n(y)$ and $h_{n+1}(y)$.

A cubic polynomial spline h(y) is preferred, because the quadratic roots of the first derivative have closed form solutions which enable efficient calculation of stationary points. However, lower or higher order polynomial splines h(y) may be used depending on the application and the available computational resources for finding stationary points of the spline segments $h_n(y)$.

The list of candidate peaks $Ry_k$ determined previously (step S12, steps S41 to S62) is retrieved, and the number $Ky_c$ of candidate peaks $Ry_k$ is determined or retrieved (step S42).

An index value k is set to k=1, corresponding to the first of $Ky_c$ candidate peaks $Ry_k$ (step S43).

Check if the $k^{th}$ candidate peak $Ry_k$ corresponds to an edge channel (step S44). This corresponds to checking whether $y_k=y_1$ or $y_k=y_N$.

It the $k^{th}$ candidate peak $Ry_k$ corresponds to an edge channel (step S44|Yes), then stationary points $S_n$ are calculated for the spline segment $h_n(y)$ connecting the candidate sensor location $y_k$ and the adjacent sensor location $y_n$, followed by determining those stationary points $S_n$ which correspond to maxima (step S45). If $y_k=y_1$ the stationary points $S_1$ of the spline segment $h_1(y)$ are calculated, whereas if $y_k=y_N$ the stationary points $S_1$ of the spline segment $h_{N-1}(y)$ are calculated.

The stationary points $S_n$ of the $n^{th}$ of N−1 spline segments $h_n(y)$ may be denoted as $S_n=\{s_{n,1}, \ldots, s_{n,P}, \ldots, s_{n,Ndeg-1}\}$, with Ndeg denoting the degree of the polynomial spline h(y) and r an index with $1 \le r \le Ndeg$. In practice, Ndeg is at least quadratic, i.e. Ndeg=2. In the preferred example of a cubic spline h(y). Ndeg=3 and $S_n=\{s_{n,1}, s_{n,2}\}$ ($s_{n,1}=s_{n,2}$ for an inflexion point). In the specific example of a cubic spline, the stationary points $s_{n,1}$, $s_{n,2}$ may be determined using the closed form quadratic equation. Stationary points $S_n$ of higher degree Ndeg>3 polynomial splines $h_n(y)$ may need to be solved using numerical root-finding methods.

It should be noted that although each spline segment $h_n(y)$ is only used to define a portion of the overall polynomial spline h(y), the equation for each spline segment $h_n(y)$ may be solved to find the stationary points $S_n$ (roots), even though said stationary points $S_n$ may lie outside of the range $y_n$ to $y_{n+1}$ over which the spline segment $h_n(y)$ defines the polynomial spline h(y).

The discussion of the following processes of the method of interpolating force values and estimating peaks H will assume for brevity that the polynomial spline $h_n(y)$ is cubic (Ndeg=3). However, the method of interpolating force values and estimating peaks H may be extended to polynomial spline h(y) of greater or lesser degree Ndeg than cubic.

Which of the stationary points $S_n=\{s_{n,1}, s_{n,2}\}$ is the maximum is determined, for example based on the sign of the second derivative of the equation for the spline segment $h_n(y)$. Inflection points (or undulation points depending on degree), with the second derivative equal to zero, are considered unlikely in practice and if such stationary points occur, these are ignored for the purposes of finding peaks. For the purposes of this description, assume that the stationary point $s_{n,1}$ denotes the maximum of the equation for the $n^{th}$ cubic spline segment $h_n(y)$.

The validity of the calculated maximum $s_{n,1}$ is checked (step S46). If the maximum $s_{n,1}$ lies within the range for which the corresponding spline segment $h_n(y)$ defines the polynomial spline h(y), then the maximum $s_{n,1}$ corresponds to a valid peak (step S46|Yes). For example, if $y_k=y_1$ then the maximum $s_{1,1}$ must satisfy $y_1 \le s_{1,1} < y_2$ in order to be valid. Similarly, if $y_k=y_{N-1}$ then the maximum $s_{N,1}$ must satisfy $y_{N-1} \le s_N \le y_N$ in order to be valid. This condition corresponds to finding a maximum $s_{n,1}$ which lies on the polynomial spline h(y). A maximum $s_{n,1}$ outside the range over which the segment $h_n(y)$ defines the polynomial spline h(y) does not actually occur on the polynomial spline h(y).

If the calculated maximums, is valid (step S46|Yes), then a $k^{th}$ peak $Hy_k=\{yp_k, Fyp_k\}$ is set by assigning the peak coordinate $yp_k$ equal to the maximum $s_{n,1}$ and assigning the peak force $Fyp_k$ equal to the value of the spline segment $h_n(s_{n,1})$ at the maximum (step S47). For edge channels, n may take the values 1 or N−1.

If the calculated maximum $s_{n,1}$ is not valid (step S46|No), then a $k^{th}$ peak $Hy_k=\{yp_k, Fp_k\}$ is set by assigning the peak coordinate $yp_k$ equal to the candidate coordinate $y_k$ and assigning the peak force $Fyp_k$ equal to the candidate force value $Fy^*_k$ (step S48).

It the $k^{th}$ candidate peak $Ry_k$ does not correspond to an edge channel (step S44|No), then stationary points $S_n$ are calculated for the spline segment $h_n(y)$ connecting the candidate sensor location $y_k$ and an adjacent sensor location $y_n$ corresponding to the largest force value, followed by determining the maximum $s_{n,1}$ (step S49).

For example, if $y_k=y_n$, then if $Fy_{n+1,i} > Fy_{n-1,i}$ the stationary points $S_n$ for the spline segment $h_n(y)$ are calculated, whereas if $Fy_{n+1,i} < Fy_{n-1,i}$ the stationary points $S_{n-1}$ for the spline segment $h_{n-1}(y)$ are calculated. The calculation of stationary points $S_n$ is the same as described hereinbefore (step S45) for an edge channel. The corresponding maximum $s_{n,1}$ or $s_{n-1,i}$ is determined from the stationary points $S_n$ or $S_{n-1}$ as described hereinbefore.

The calculated maximum $s_{n,1}$ or $s_{n-1,1}$ is tested for validity (S50). The calculated maximum $s_{n,1}$ or $s_{n-1,1}$ is valid if it lies within the range over which the corresponding spline segment $h_n(y)$ or $h_{n-1}(y)$ defines the polynomial spline $h(y)$, and invalid otherwise. This is the same condition applied to maxima $s_{1,i}$, $s_{N,1}$ calculated for an edge channel (step S46).

If the calculated maximum $s_{n,1}$, or $s_{n-1,1}$ is valid (step S50|Yes), then a $k^{th}$ peak $Hy_k = \{yp_k, Fyp_k\}$ is set (step S47). For example, if $Fy_{n+1,i} > Fy_{n-1,i}$ then the $k^{th}$ peak $Hy_k = \{yp_k, Fyp_k\}$ is set by assigning the peak coordinate $yp_k$ equal to the maximum $s_{n,1}$ and assigning the peak force $Fyp_k$ equal to the value of the spline segment $h_n(s_{n,1})$ at the maximum. However, if $Fy_{n+1,i} < Fy_{n-1,i}$ then the $k^{th}$ peak $Hy_k = \{yp_k, Fyp_k\}$ is set by assigning the peak coordinate $yp_k$ equal to the maximum $s_{n-1,i}$ and assigning the peak force $Fyp_k$ equal to the value of the spline segment $h_{n-1}(s_{n-1,i})$ at the maximum.

If the calculated maximum $s_{n,1}$ or $s_{n-1,i}$ is not valid (step S50|No), then stationary points $S_n$ are calculated for the other spline segment $h_n(y)$ connecting the candidate sensor location $y_k$ and the other adjacent sensor location $y_n$, followed by determining the maximum $s_{n-1,i}$ or $s_{n,1}$ (step S51).

For example, if $Fy_{n+1,i} > Fy_{n-1,i}$ so that the stationary points $S_n$ and maximum $s_{n,i}$ for the $n^{th}$ spline segment $h_n(y)$ were calculated first (step S49), then if the first calculated maximum $s_{n,1}$ is not valid (step S50|no), then the stationary points $S_{n-1}$ and maximum $s_{n-1,i}$ for the $n-1^{th}$ spline segment $h_{n-1}(y)$ are calculated second (step S51). Alternatively, if $Fy_{n+1,i} < Fy_{n-1,i}$ so that the stationary points $S_{n-1}$ and maximum $s_{n-1,i}$ for the $n-1^{th}$ spline segment $h_{n-1}(y)$ were calculated first (step S49), then if the first calculated maximum $s_{n-1,i}$ is not valid (step S50|no), then the stationary points $S_n$ and maximum $s_{n,1}$ for the $n^{th}$ spline segment $h_n(y)$ are calculated second (step S51).

The second calculated maximum, $s_{n-1,1}$ or $s_{n,1}$, as appropriate, is checked for validity (step S52). If the second calculated maximum, $s_{n-1,1}$ or $s_{n,1}$, is valid (step S52|Yes), then the $k^{th}$ peak $Hy_k = \{yp_k, Fyp_k\}$ is set using the calculated maximum, $s_{n-1,1}$ or $s_{n,1}$ (step S47).

However, if no valid maximum $s_{n,1}$ is found in either spline segment $h_n(y)$, $h_n(y)$ (step S52|No), then no peak H is assigned, and after incrementing k to k+1 (step S53), the $k+1^{th}$ candidate peak $Ry_{k+1}$ is processed (step S44).

If the $k^{th}$ peak $Hy_k$ has been set, check whether all candidate peaks $Ry_k$ have been processed, i.e. whether k<Kc (step S54). If k<Kc (step S54|Yes), then there are further candidate peaks $Ry_k$ to process, and after incrementing k to k+1 (step S53), the $k+1^{th}$ candidate peak $Ry_{k+1}$ is processed (step S44).

If k≥Kc (step S4|No), then there are no further candidate peaks $Ry_k$ to process.

Figure 12:
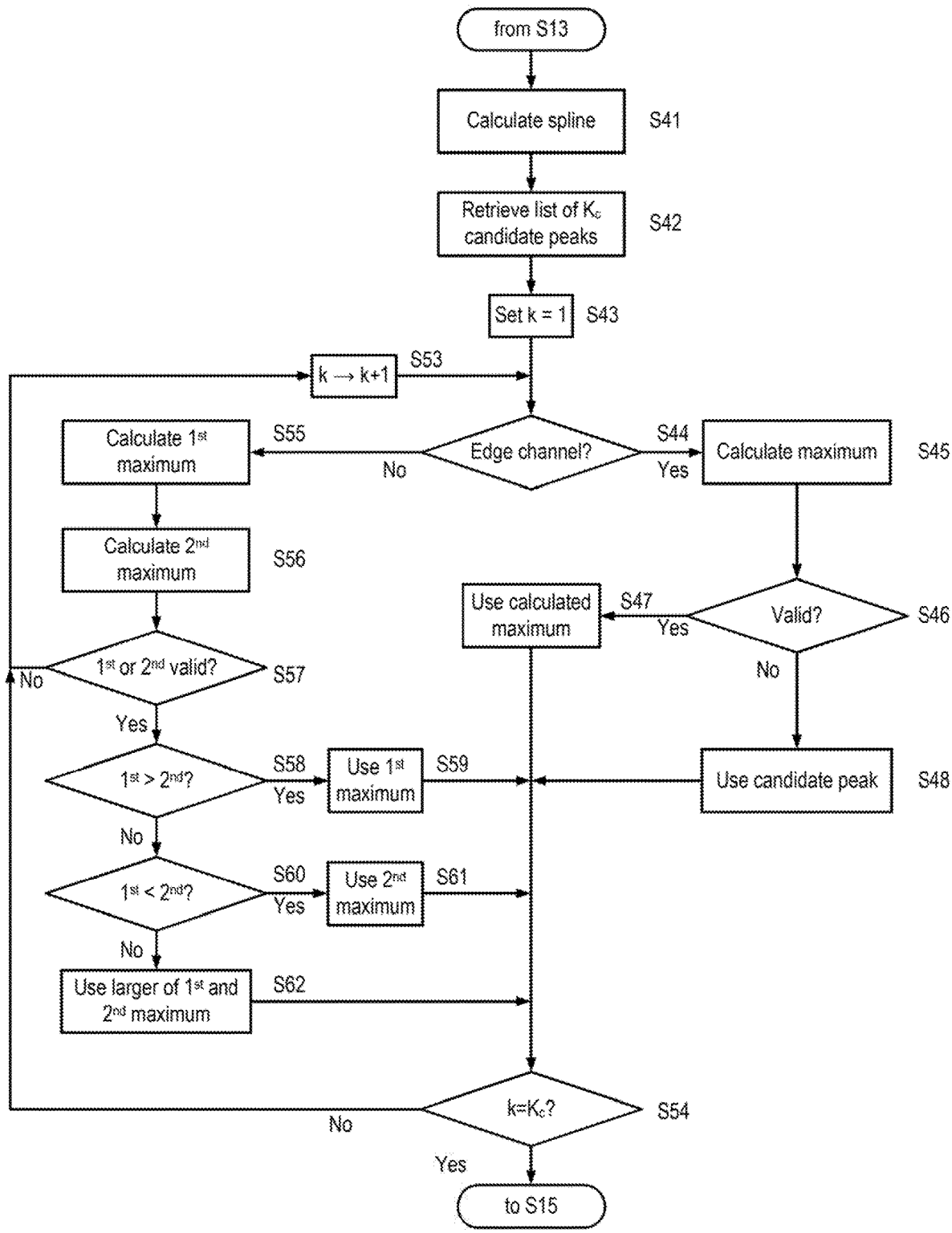
FIG. 12 is a process-flow diagram of a second method of interpolating force values and estimating peaks.

Second method using polynomial splines: Referring also to FIG. 12, a process-flow diagram of a second exemplary method of interpolating force values and estimating peaks H is shown (step S14). However, the second exemplary method of interpolating force values and estimating peaks H (step S14) may employ any suitable alternative methods for generating and/or updating force information 21.

The second exemplary method of interpolating force values and estimating peaks H will be explained with reference to the first force values $Fy_{n,i}$ and the corresponding sensor locations $y_n$ and candidate peaks $Ry_k = \{y_k, Fy^*_k\}$. However, the second exemplary method of interpolating force values and estimating peaks H is equally applicable to the second force values $Fx_{m,i}$, or any other set of force values $F_i$ corresponding to sensor locations spaced apart along a direction.

For brevity, the second exemplary method of interpolating force values and estimating peaks H will be explained with reference to a cubic polynomial spline h(y) and taking the stationary point $s_{n,1}$ to correspond to the maximum of the $n^{th}$ of N-1 spline segments $h_n(y)$.

The second exemplary method of interpolating force values and estimating peaks H is identical to the first method for processing edge channels (steps S41 to S48).

The difference occurs if the $k^{th}$ candidate peak $Ry_k$ does not correspond to an edge channel (step S44|No).

Stationary points $S_n$ and corresponding maxima $s_{n,1}$ are calculated for both spline segments $h_n(y)$ connecting to the candidate location $y_k$ (steps S55 and S56). For example, if the candidate location $y_k$ corresponds to the $n^{th}$ sensor location $y_k = y_n$, then first stationary points $S_{n-1}$ and a corresponding first maximum $s_{n-1,1}$ are calculated for a first spline segment $h_{n-1}(y)$ connecting the sensor locations $y_{n-1}$ and $y_n$ (step S55). Additionally, second stationary points $S_n$ and a corresponding second maximum $s_{n,1}$ are calculated for a second spline segment $h_n(y)$ connecting the sensor locations $y_n$ and $y_{n+1}$ (step S56).

The validity of the first and second maxima $s_{n-1}$, $s_{n,1}$ are tested (step S57). Compared to the first method (steps S50, S52), the second method determines validity of the first and second maxima $s_{n-1,1}$, $s_{n,1}$ according to different criteria.

In particular, if the first maximum $s_{n-1,1}$ lies within the range $y_{n-1} \leq s_{n-1,1} < y_n$ of the first spline segment $h_{n-1}(y)$, then the first maximum $s_{n-1,1}$ is assigned as valid and flagged as high priority. However, if the first maximum $s_{n-1,1}$ lies within the range $y_n \leq s_{n-1,1} < y_{n+1}$ of the second spline segment $h_n(y)$, then the first maximum $s_{n-1,1}$ is still assigned as valid, but is flagged as low priority. If the first maximum $s_{n-1,1}$ lies outside the range of the first and second spline segments $h_{n-1}(y)$, $h_n(y)$, i.e. if $s_{n-1,1} < y_{n-1}$ or $y_{n+1} \leq s_{n-1,1}$, then the first maximum s $s_{n-1,1}$ is assigned as invalid.

Similarly, if the second maximum $s_{n,1}$ lies within the range $y_n \leq s_{n,1} < y_{n+1}$ of the second spline segment $h_n(y)$, then the second maximum $s_{n,1}$ is assigned as valid and flagged as high priority. However, if the second maximum $s_{n,1}$ lies within the range $y_{n-1} \leq s_{n,1} < y_n$ of the first spline segment $h_{n-1}(y)$, then the second maximum $s_{n,1}$ is still assigned as valid, but is flagged as low priority. If the second maximums $s_{n,1}$ lies outside the range of the first and second spline segments $h_{n-1}(y)$, $h_n(y)$, i.e. if s $s_{n,1} < y_{n-1}$ or $y_{n+1} \leq s_{n,1}$, then the second maximum $s_{n,1}$ is assigned as invalid.

If both of the first and second maxima $s_{n-1,1}$, $s_{n,1}$ are invalid (step S57|No), then no peak $Hy_k$ is assigned, the index k is incremented to k+1 (step S53) and the next candidate peak $Ry_k$ is considered (step S44).

If the first maximum $s_{n-1,1}$ is valid (step S57|Yes) and the second maximum $s_{n,1}$ is invalid (step S58|Yes), then the $k^{th}$ peak $Hy_k$ is assigned based on the first maximum $s_{n-1,1}$ (step S59).

If both maxima $s_{n-1,1}$, $s_{n,1}$ are valid (step S57|Yes) and the first maximum $s_{n-1,1}$ is high priority whilst the second maximum $s_{n,1}$ is low priority (step S58|Yes), then the $k^{th}$ peak $Hy_k$ is assigned based on the first maximum $s_{n-1,1}$ (step S59).

If the second maximum $s_{n,1}$ is valid (step S57|Yes) and the first maximum $s_{n-1,1}$ is invalid (step S58|NO, step S60|Yes), then the $k^{th}$ peak $Hy_k$ is assigned based on the second maximum $s_{n,1}$ (step S61).

If both maxima $s_{n-1,1}$, $s_{n,1}$ are valid (step S57|Yes) and the second maximum $s_{n,1}$ is high priority whilst the first maximum $s_{n-1,1}$ is low priority (step S58|NO, step S60|Yes), then the $k^{th}$ peak $Hy_k$ is assigned based on the second maximum $s_{n,1}$ (step S61).

If both maxima $s_{n-1,1}$, $s_{n,1}$ are valid (step S57|Yes) and both maxima $s_{n-1,1}$, $s_{n,1}$ have equal priority (step S58|NO, step S60|No), then the $k^{th}$ peak $Hy_k$ is assigned based on whichever of the first or second maxima $s_{n-1,1}$, $s_{n,1}$ corresponds to the largest value of the polynomial spline $h(s_{n-1,1})$, $h(s_{n,1})$.

Method using Fourier transforms: Referring also to FIG. 13, a process-flow diagram of a third exemplary method of interpolating force values and estimating peaks H is shown (step S14). However, the method of interpolating force values and estimating peaks H (step S14) may employ any suitable alternative methods for generating and/or updating force information 21.

The third exemplary method of interpolating force values and estimating peaks H will be explained with reference to the first force values $Fy_{n,i}$ and the corresponding sensor locations $y_n$ and candidate peaks $Ry_k=\{y_k, Fy^*_k\}$. However, the third exemplary method of interpolating force values and estimating peaks H is equally applicable to the second force values $Fx_{m,i}$, or any other set of force values $F_i$ corresponding to sensor locations spaced apart along a direction.

If the sensor locations y are not equally spaced, then the force values $Fy_{n,i}$ and corresponding sensor locations $y_n$ are shifted to equi-spaced locations $y'_n$ and transformed force values $Fy'_{n,i}$ (step S63). This process may be omitted if sensor locations $y_n$ are approximately equally spaced.

Figure 14:
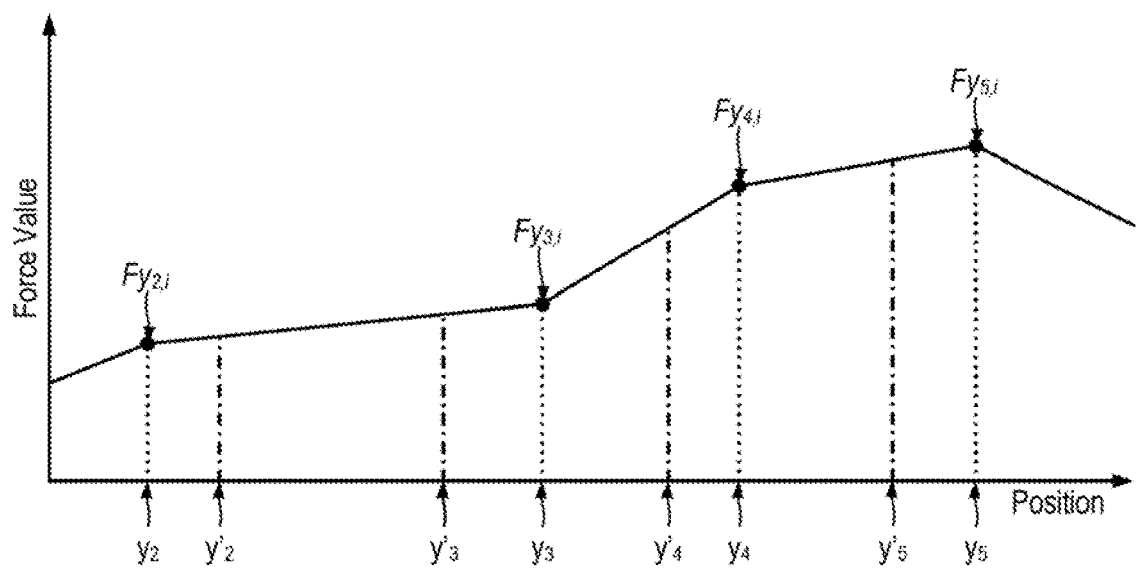
FIG. 14 illustrates a method of calculating transformed force values corresponding to equi-spaced locations.

Referring also to FIG. 14, an exemplary method of calculating transformed force values $Fy'_{n,i}$ is described in further detail hereinafter.

Letting $\Phi_n=\Phi(\omega_n)$ represent the complex magnitude corresponding to the $n^{th}$ of N frequencies $\omega_n$, a frequency spectrum $\Phi_n$ is obtained by calculating a discrete Fourier transform of the force values $Fy_{n,i}$, or the transformed force values $Fy'_{n,i}$ (step S64). Only half of the values $\Phi_n$ are unique, up to the Nyquist frequency $\omega_{nyq}$, and the remaining frequencies $\omega_n>\omega_{nqy}$, correspond to reflected values $\Phi_n$. The frequency spectrum $\Phi_n$ may be obtained using a fast Fourier transform (FFT) algorithm.

Figure 15:
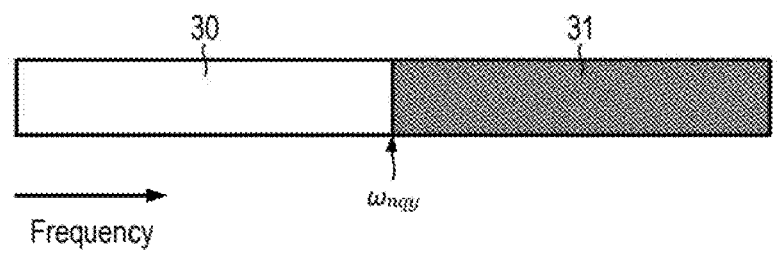
FIG. 15 illustrates a frequency spectrum.

For example, referring also to FIG. 15, an array storing the frequency spectrum $\Phi_n$ is schematically illustrated.

A first block 30 holds unique values of the frequency spectrum $\Phi_n$, up to $\omega_{nqy}$. A second block 31 holds the same N/2 values of the frequency spectrum $\Phi_n$, reflected about the Nyquist frequency $\omega_{nyq}$. In other words, $\Phi_{n1}=\Phi_{n2}$ for index values n1<N/2 and n2=N−n1+1.

A zero-inserted frequency spectrum $\Phi zero_n$ is obtained by inserting a number $N_{zero}$ of zeros above the Nyquist frequency $\omega_{nyq}$ (step S65). The zero-inserted frequency spectrum $\Phi zero_n$ includes a total number Nint=N+Nzero values in total.

Figure 16:
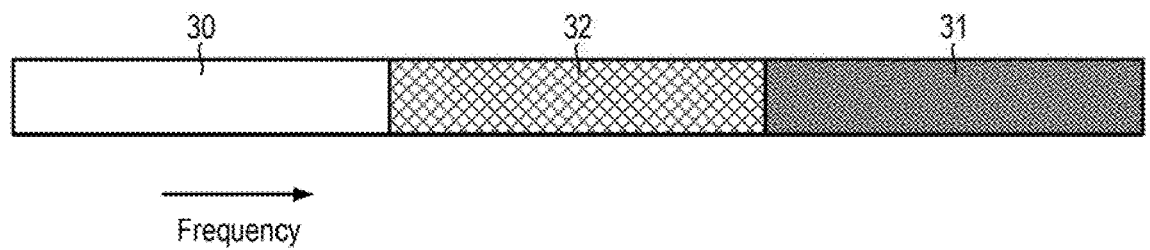
FIG. 16 illustrates zero-insertion into the frequency spectrum shown in FIG. 15.

For example, referring also to FIG. 16, a block of zeros 32 is inserted between the first and second blocks 30, 31.

Interpolated force values G are obtained by calculating an inverse discrete Fourier transform of the zero-inserted frequency spectrum $\Phi zero_n$ (step S66). The interpolated force values G take the form of a number Nint=N+Nzero of discrete values $G_1, \ldots, G_n, \ldots G_{Nint}$ corresponding to interpolated locations $yint_1, \ldots, yint_n, \ldots, yint_{Nint}$ which are more closely spaced than the original sensor locations $y_n$. It should be noted that the interpolated locations $yint_1, \ldots, yint_n, \ldots, yint_{Nint}$ span the same range as the sensor locations $y_n$ such that $yint_1=y_1$ and $yint_{Nint}=y_N$.

Forced periodicity artefacts may be removed from the interpolated force values G (step S67).

Figure 17:
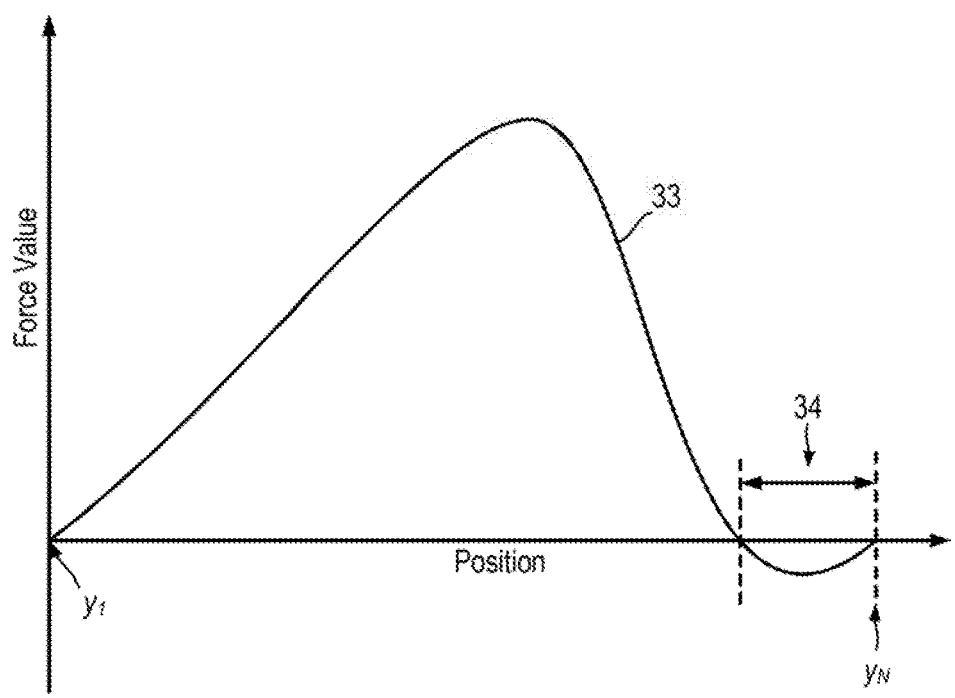
FIG. 17 schematically illustrates an example of interpolated force values.

Referring also to FIG. 17, an example of interpolated force values G, 33 is shown.

The process of obtaining the Fourier transform (step S64), inserting zeros (step S65) and then calculating the inverse Fourier transform (step S66) forces the interpolated force values G to be periodic, which may cause a tail artefact region 34 to be introduced.

Figure 18:
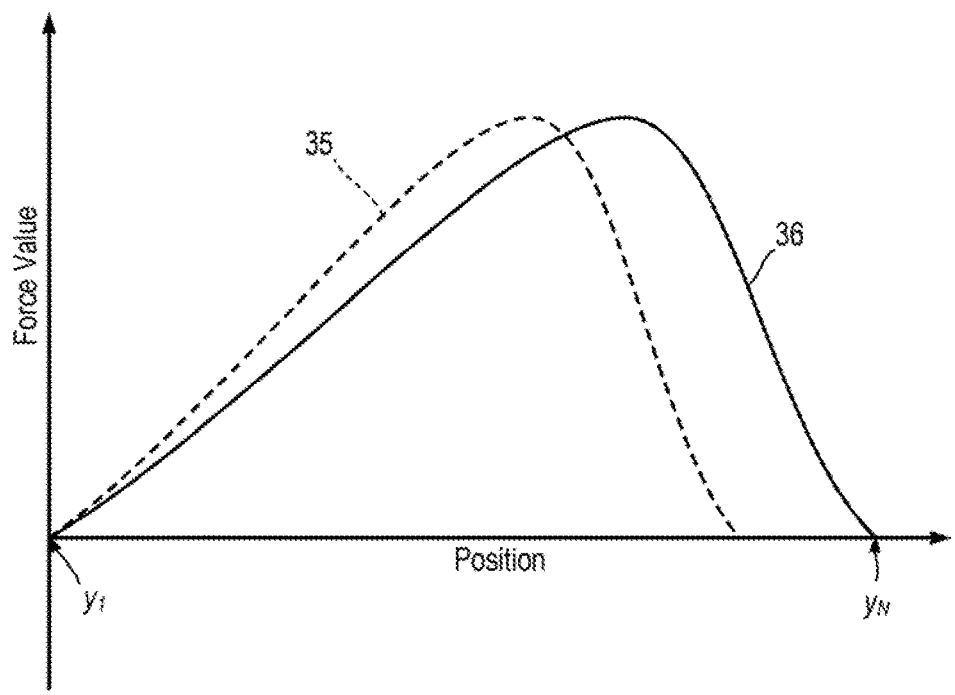
FIG. 18 schematically illustrates an example of corrected interpolated force values.

Referring also to FIG. 18, the tail artefact region 34 may be removed to form truncated interpolated force values $G_{trun}$, 35. The truncated interpolated force values $G_{trun}$, 35 are then linearly warped to obtained corrected interpolated force values $G_{cor}$, 36 spanning the original range of sensor locations $y_n$ from $y_1$ to $y_N$.

Figure 19:
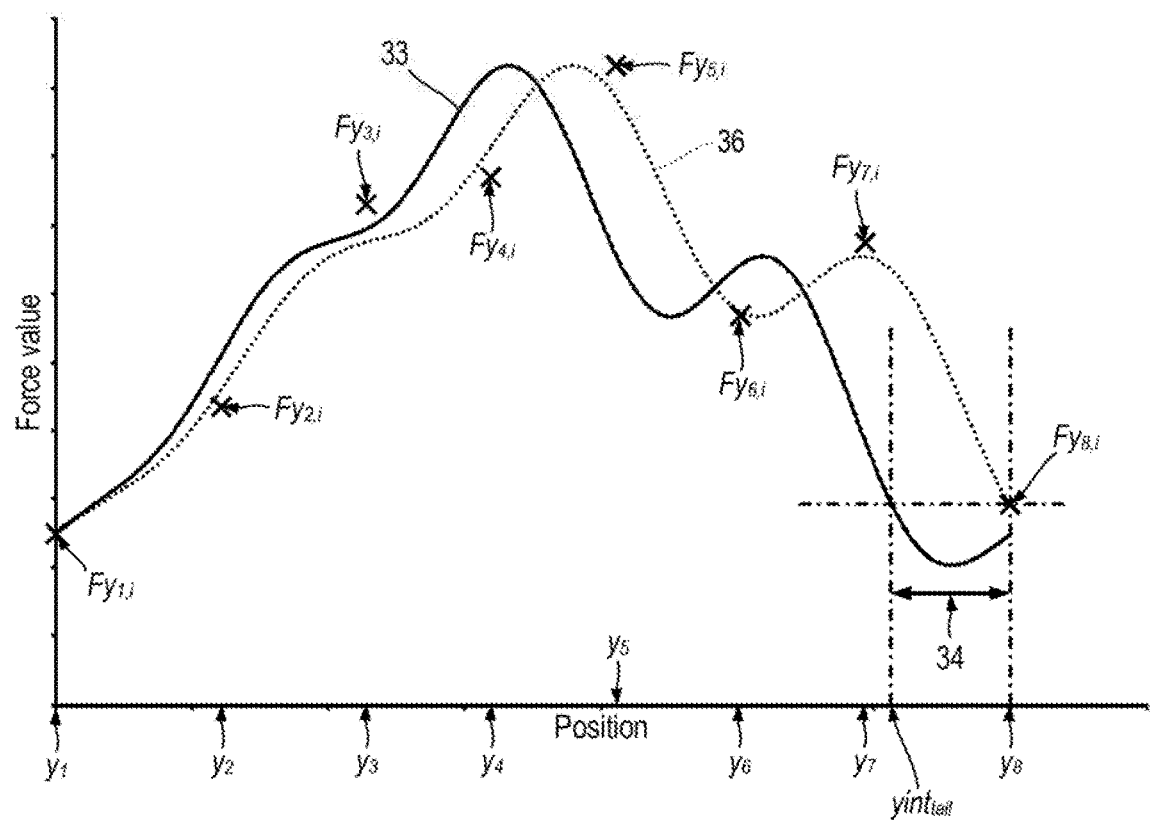
FIG. 19 presents an experimental example of interpolated force values and corrected interpolated force values.

Referring also to FIG. 19, an experimental example of tail artefact region removal is shown.

The experimental data were obtained from an example of a touch panel 10 including N=8 first sensors 5. It may be observed that the interpolated force values 33, G obtained directly from inverting the zero-inserted frequency spectrum $\Phi zero_n$ provide a poor correspondence to the measured force values $Fy_{1,i}, \ldots, Fy_{8,i}$, which is believed to be the result of forced periodicity artefacts. The tail artefact region 34 is defined as the region $yint_{tail}$ to $yint_{Nint}=y_N$ in which the interpolated force values G drop below the last force value $Fy_{8,i}$, i.e. the region in which $G<Fy_{8,i}$. It may be observed that following removal of the tail artefact region 34 and linear warping to span the original region $y_1$ to $y_8$, the corrected interpolated force values $G_{cor}$, 36 provide improved correspondence to the measured force values $Fy_{1,i}, \ldots, Fy_{8,i}$.

In other examples, the tail artefact region 34 may be defined as the region for which the interpolated force values G drop below a minimum force value $\min\{Fy_{1,1}, \ldots, Fy_{n,i}, \ldots, Fy_{N,i}\}$.

Referring again to FIG. 13 the listing of the $Ky_c$ candidate peaks $Ry_k=\{y_k, Fy^*_k\}$ is retrieved (step S68).

An index k is set to k=1 to start with consideration of the first of $Ky_c$ candidate peaks $Ry_k$ (step S69).

Using the location $y_k$ of the $k^{th}$ candidate peak $Ry_k$ as a starting point, the interpolated force values G, or preferably the corrected interpolated force values $G_{cor}$, are searched for a local maximum (step S70). For example, a gradient ascent method may be used based on numerical gradients calculated for the interpolated force values G or corrected interpolated force values $G_{cor}$. The location of the maximum found may be denoted $yint_{max}$, and the corresponding corrected interpolated force values $G_{cor}(yint_{max})$.

It should be checked whether the maximum $G_{cor}(yint_{max})$ is unique, or whether it has already been found for a previously processed peak candidate $Ry_k$ (Step S71). If two candidate peaks $Ry_k$ converge to the same calculated coordinate $yint_{max}$, then the initial detection as separate candidate peaks $Ry_k$ was likely erroneous, and only one corresponding peak $Hy_k$ should be assigned.

If the calculated coordinate $yint_{max}$ is unique so far (step S71|Yes), then the $k^{th}$ peak $Hy_k=\{yp_k, Fyp_k\}$ is set by assigning the peak location $yp_k=yint_{max}$ and assigning the peak force value $Fyp_k=G_{cor}(yint_{max})$(step S72).

If the calculated coordinate $yint_{max}$ has already been found (step S71|No), then a new peak $Hy_k$ is not assigned (skip step S72).

If the index k=Kyc (step S73|Yes) then all candidate peaks $Ry_k$ have been processed.

If the index k<Kyc (step S73|No), then the index k is incremented to k+1 and the next candidate peak $Ry_k$ is processed (step S70).

Referring again to FIG. 14, examples of calculating transformed force values $Fy'_{n,i}$ corresponding to equi-spaced locations $y'_n$ are illustrated. However, any suitable alternative method of calculating transformed force values $Fy'_{n,i}$ may be used instead.

The example of calculating transformed force values $Fy'_{n,i}$ corresponding to equi-spaced locations $y'_n$ will be explained with reference to the first force values $Fy_{n,i}$ and the corresponding sensor locations $y_n$. However, the example of calculating transformed force values $Fy'_{n,i}$ corresponding to equi-spaced locations $y'_n$ are equally applicable to the second force values $Fx_{m,i}$, or any other set of force values $F_i$ corresponding to sensor locations spaced apart along a direction.

A transformed force value $Fy'_{n,i}$ corresponding to an equi-spaced location $y'_n$ may simply be calculated based on linear interpolation of the bracketing sensor locations $y_n$ and corresponding force values $Fy_{n,i}$. For example, the second transformed force value $Fy'_{2,i}$ may be calculated according to:

$$Fy'_{2,i} = Fy_{2,i} + \frac{y'_2 - y_2}{y_3 - y_2}(Fy_{3,i} - Fy_{2,i})$$

Similarly, the third, fourth and fifth transformed force values $Fy'_{3,i}$, $Fy'_{4,i}$, $Fy'_{5,i}$ may be respectively calculated according to:

$$Fy'_{3,i} = Fy_{2,i} + \frac{y'_3 - y_2}{y_3 - y_2}(Fy_{3,i} - Fy_{2,i})$$

$$Fy'_{4,i} = Fy_{3,i} + \frac{y'_4 - y_3}{y_4 - y_3}(Fy_{4,i} - Fy_{3,i})$$

$$Fy'_{5,i} = Fy_{4,i} + \frac{y'_5 - y_4}{y_5 - y_4}(Fy_{5,i} - Fy_{4,i})$$

Figure 20:
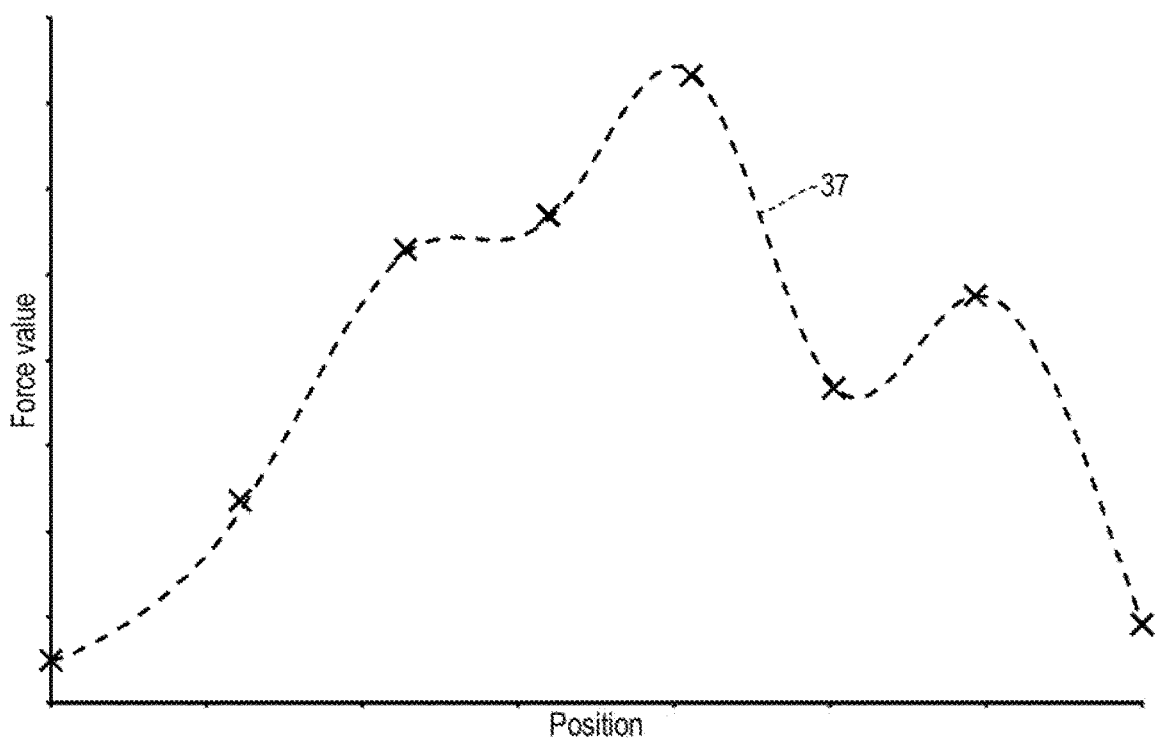
FIG. 20 presents a comparison of measured force values to interpolated force values obtained using a cubic polynomial spline.

Experimental data: Referring also to FIG. 20, a comparison of measured force values $Fy_{n,i}$ to interpolated force values G, 37 obtained (FIG. 11) in the form of a cubic polynomial spline h(y) is shown.

As would be expected given the nature of a polynomial spline h(y), the interpolated force values G pass through the measured force values $Fy_{n,i}$. It may be observed that the peaks of the interpolated force values G, corresponding to peaks $Hy_k$, lie between sensor locations $y_n$.

Figure 21:
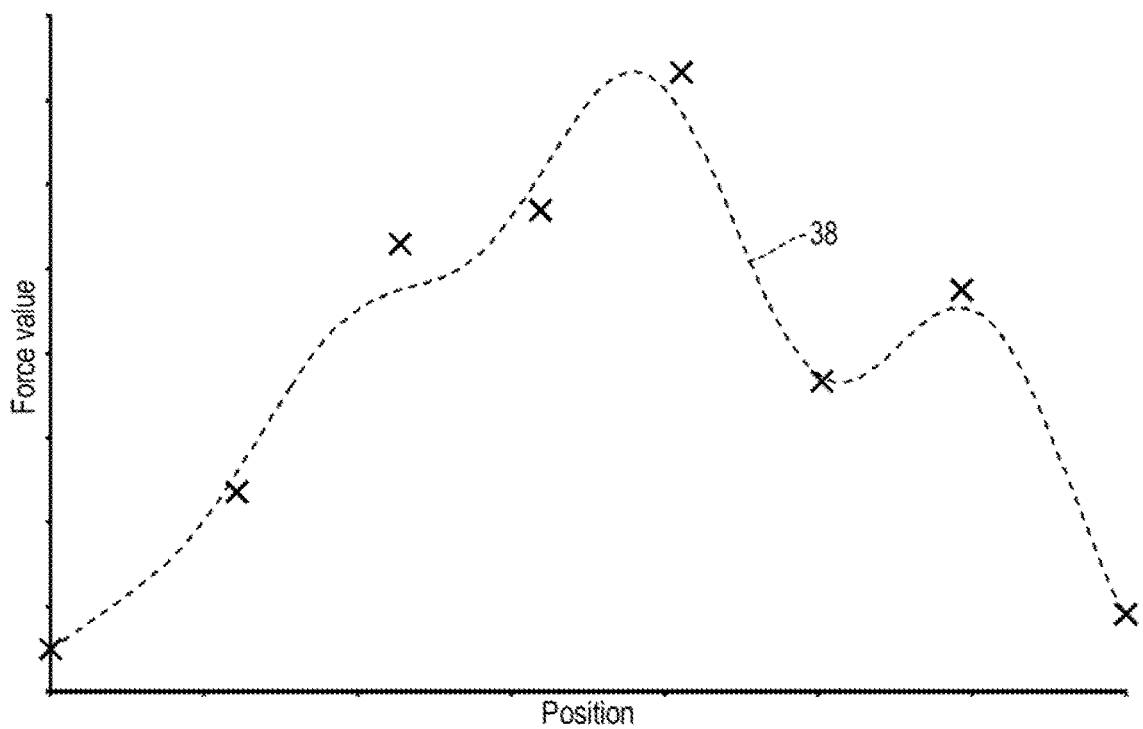
FIG. 21 presents a comparison of measured force values to corrected interpolated force values obtained using a Fourier transform method.

Referring also to FIG. 21, a comparison of measured force values $Fy_{n,i}$ to corrected interpolated force values $G_{cur}$, 38 obtained using the Fourier transform method (FIG. 13) is shown.

In particular, a fast Fourier transform method was used to obtain the corrected interpolated force values $G_{cor}$, 38. It may be observed that the corrected interpolated force values $G_{cor}$, 38 generally follow the measured force values $Fy_{n,i}$, although unlike for the cubic spline h(y), 37, the corrected interpolated force values $G_{cor}$, 38 are not constrained to pass through the corrected interpolated force values $G_{cor}$, 38.

Figure 22:
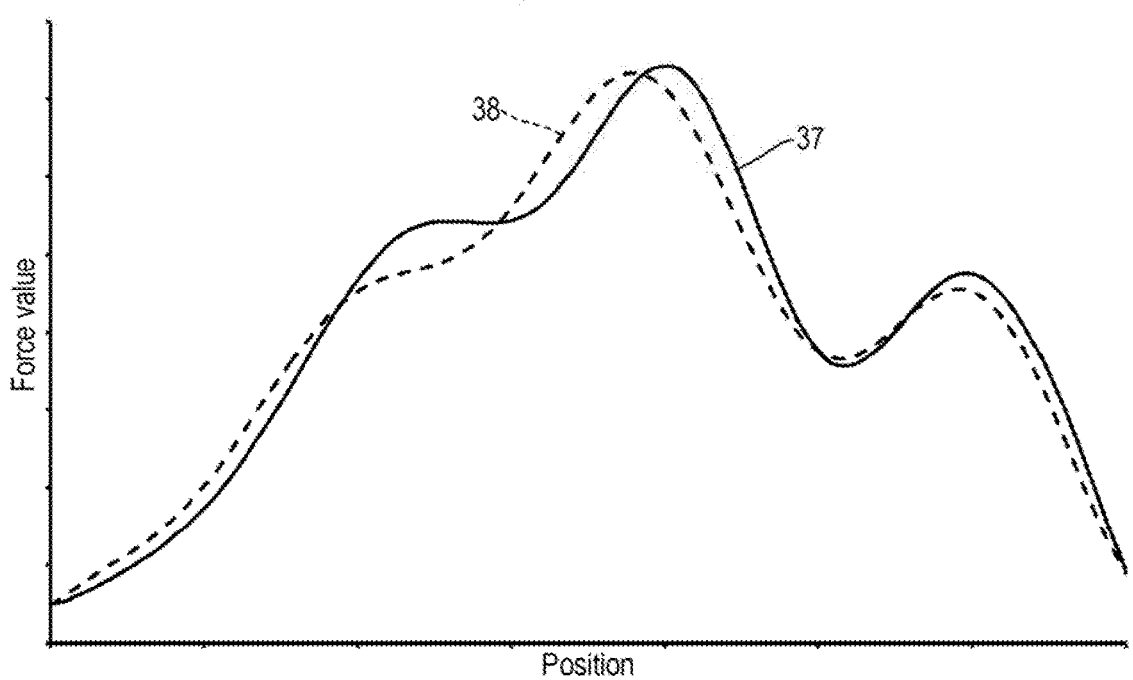
FIG. 22 presents a comparison of interpolated force values shown in FIG. 20 to corrected interpolated force values shown in FIG. 21.

Referring also the FIG. 22, a comparison of the interpolated force values G, 37 in the form of a cubic polynomial spline h(y) and the corrected interpolated force values $G_{cor}$, 38 obtained using Fourier transform methods is shown.

The results 37, 38 of the two methods are broadly in agreement, although slight differences in the estimated peak locations $yp_k$ and peak force values $Fyp_k$ may be observed, which are thought to result from the constraint of the polynomial spline h(y) to pass through the originally measured force values $Fy_{n,i}$.

In general, the polynomial spline h(y) method (FIGS. 11, 12) may be relatively faster than the Fourier transform method (FIG. 13), especially when a cubic spline h(y) is used. However, because the corrected interpolated force values $G_{cor}$, 38 obtained using Fourier transform methods (FIG. 13) are not constrained to pass through the originally measured force values $Fy_{n,i}$, Fourier transform methods (FIG. 13) may be less influenced by any noise in the measured force values $Fy_{n,i}$.

MODIFICATIONS

It will be appreciated that various modifications may be made to the embodiments hereinbefore described. Such modifications may involve equivalent and other features which are already known in the design, manufacture and use of touch panels and component parts thereof and in the processing of signals from touch panels, which may be used instead of, or in addition to, features already described herein. Features of one embodiment may be replaced or supplemented by features of another embodiment.

Although the measurement front end 14, the force signal processing module 15, and the capacitance signal processing module 16 have been illustrated as separate components, in practice some or all of these elements may be provided by a single integrated device such as, for example, a microcontroller or an application specific integrated circuit.

Although the force channels 26 and location processing module 27 may be provided as separate components, in some examples the force channels 26 and location processing module 27 may be provided by a single integrated device such as, for example, a microcontroller or an application specific integrated circuit. The functions of the force channels 26 and the location processing module 27 may be integrated in a single device with the functions of the measurement front end 14 and/or the capacitance signal processing module 16.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of processing a plurality of force values, each force value corresponding to a sensor location, wherein the sensor locations are spaced apart along a direction, the method comprising:
    receiving the plurality of force values;
    determining whether the plurality of force values include one or more candidate peaks, each candidate peak corresponding to a local maximum of the plurality of force values; and
    in response to at least one candidate peak exceeding a minimum force threshold:
        interpolating the plurality of force values;
        estimating a number of peak coordinates and corresponding peak force values based on the interpolated force values and the candidate peaks which exceed the minimum force threshold; and further comprising, for each peak coordinate:
  in response to determining that the peak coordinate is associated with a tracked touch event:
    adding the peak coordinate to a coordinate buffer which stores a number of previously estimated peak coordinates for the tracked touch event;
    calculating an average coordinate based on the coordinate buffer; and,
    outputting the average coordinate and the peak force value;
  or,
  in response to determining that the peak coordinate is not associated with any tracked touch event:
    storing the peak coordinate and the corresponding peak force value to a new tracked touch event; and
    outputting the peak coordinate and the corresponding peak force value.

2. The method according to claim 1, further comprising in response to at least one peak force value exceeding a second force threshold, outputting each peak force value which exceeds the second force threshold and the corresponding peak coordinates.

3. The method according to claim 1, wherein interpolating the plurality of force values comprises calculating a polynomial spline using the plurality of force values.

4. The method according to claim 3, wherein each candidate peak corresponds to a candidate sensor location and a candidate force value, and wherein estimating a number of peak coordinates and corresponding peak force values based on the interpolated force values and the one or more candidate peaks comprises, for each candidate peak:
  in response to determining that the candidate sensor location is equal to a minimum or maximum sensor location:
    calculating stationary points of a first spline segment connecting the candidate sensor location and the adjacent sensor location;
    determining whether a first stationary point corresponding to a maximum is located within the first spline segment; and
      in response to a positive determination that the first stationary point corresponding to a maximum is located within the first spline segment, assigning a peak coordinate equal to the first stationary point and assigning a corresponding peak value equal to evaluating the first spline segment at the peak coordinate;
      in response to a negative determination that the first stationary point corresponding to a maximum is not located within the first spline segment, assigning a peak coordinate equal to the candidate sensor location and assigning a corresponding peak value equal to the candidate force value; or
  in response to determining that the candidate sensor location does not correspond to a minimum or maximum sensor location:
    calculating stationary points of a second spline segment connecting the candidate sensor location and the adjacent sensor location corresponding to the largest force value;
      in response to determining that a second stationary point corresponding to a maximum is located within the second spline segment, assigning a peak coordinate equal to the second stationary point and assigning a corresponding peak value equal to evaluating the second spline segment at the peak coordinate;
      in response to determining that a stationary point corresponding to a maximum is not located within the second spline segment:
        calculating stationary points of a third spline segment connecting the candidate sensor location and the other adjacent sensor location; and
        in response to determining that a third stationary point corresponding to a maximum is located within the third spline segment, assigning a peak coordinate equal to the third stationary point and assigning a corresponding peak value equal to evaluating the third spline segment at the peak coordinate.

5. The method according to claim 3, wherein each candidate peak corresponds to a candidate sensor location and a candidate force value, and wherein estimating a number of peak coordinates and corresponding peak force values based on the interpolated force values and the one or more candidate peaks comprises, for each candidate peak:
  in response to determining that the candidate sensor location corresponds to a minimum or maximum sensor location:
    calculating stationary points of a first spline segment connecting the candidate sensor location and the adjacent sensor location;
    determining whether a first stationary point corresponding to a maximum is located within the first spline segment; and
      in response to a positive determination that the first stationary point corresponding to a maximum is located within the first spline segment, assigning a peak coordinate equal to the first stationary point and assigning a corresponding peak value equal to evaluating the first spline segment at the peak coordinate;
      in response to a negative determination that the first stationary point corresponding to a maximum is not located within the first spline segment, assigning a peak coordinate equal to the candidate sensor location and assigning a corresponding peak value equal to the candidate force value; or
  in response to determining that the candidate sensor location does not correspond to a minimum or maximum sensor location:
    calculating stationary points of a second spline segment connecting the candidate sensor location to one of the adjacent sensor locations and:
      in response to determining that a second stationary point corresponding to a maximum is located within the second spline segment, assigning the second stationary point as valid and high priority;
      in response to determining that the second stationary point is located within the third spline segment, assigning the second stationary point as valid and low priority;
    calculating stationary points of a third spline segment connecting the candidate sensor location to the other adjacent sensor location;
      in response to determining that a third stationary point corresponding to a maximum is located within the third spline segment, assigning the third stationary point as valid and high priority;
      in response to determining that the third stationary point corresponding to a maximum is located within the second spline segment, assigning the third stationary point as valid and low priority;

assigning a peak coordinate and corresponding peak value according to:
  in response to the second stationary point is valid and there is no valid third stationary point, assigning the peak coordinate equal to the second stationary point and assigning the corresponding peak value equal to evaluating the second spline segment at the peak coordinate;
  in response to the third stationary point is valid and there is no valid second stationary point, assigning the peak coordinate equal to the third stationary point and assigning the corresponding peak value equal to evaluating the third spline segment at the peak coordinate;
  in response to the second stationary point is high priority and the third stationary point is low priority, assigning the peak coordinate equal to the second stationary point and assigning the corresponding peak value equal to evaluating the second spline segment at the peak coordinate;
  in response to the third stationary point is high priority and the second stationary point is low priority, assigning the peak coordinate equal to the third stationary point and assigning the corresponding peak force value equal to evaluating the third spline segment at the peak coordinate; and
  in response to the second and third stationary points are both high priority or both low priority, assigning the peak coordinate equal to whichever of the second and third stationary points corresponds to the larger force value and assigning the corresponding peak force value equal to evaluating the respective spline segment at the peak coordinate.

6. The method according to claim 1, wherein interpolating the plurality of force values comprises:
  obtaining a frequency spectrum by calculating a discrete Fourier transform based on the plurality of force values;
  generating a zero-inserted frequency spectrum by inserting a plurality of zero values at a high frequency end of the frequency spectrum; and,
  obtaining interpolated force values based on calculating an inverse discrete Fourier transform of the zero-inserted frequency spectrum.

7. The method according to claim 6, wherein estimating a number of peak coordinates and corresponding peak force values based on the interpolated force values and the one or more candidate peaks comprises, for each candidate peak:
  searching for a local maximum of the interpolated force values using the candidate peak as a starting location; and
  in response to locating a local maximum of the interpolated force values which has not already been assigned to another candidate peak, assigning a peak force value equal to the local maximum and assigning a corresponding peak coordinate equal to a location of the local maximum.

8. The method according to claim 7, further comprising transforming the plurality of force values corresponding to sensor locations to a plurality of transformed force values corresponding to equi-spaced locations, wherein the frequency spectrum is obtained by calculating a discrete Fourier transform of the plurality of transformed force values.

9. The method according to claim 6, further comprising transforming the plurality of force values corresponding to sensor locations to a plurality of transformed force values corresponding to equi-spaced locations, wherein the frequency spectrum is obtained by calculating a discrete Fourier transform of the plurality of transformed force values.

10. The method according to claim 9, wherein the transformation of the plurality of force values to the plurality of transformed force values comprises interpolation based on the pair of sensor locations and force values bracketing each equi-spaced location.

11. A The method comprising:
  processing a plurality of first force values and a plurality of second force values according to the method of claim 1, each first force value corresponding to a sensor location of a plurality of first sensor locations, wherein the plurality of first sensor locations are spaced apart along a first direction; and
  each second force value corresponding to a sensor location of a plurality of second sensor locations, wherein the plurality of second sensor locations are spaced apart along a second direction which is different to the first direction; and
    wherein peak coordinates estimated based on the first force values are matched with peak coordinates estimated based on the second force values to obtain two-dimensional coordinates.

12. The method according to claim 11, wherein peak force values are estimated based on an average or a weighted average of first peak values determined based on the first force values and second peak values determined based on the second force values.

13. An apparatus for processing piezoelectric signals received from a touch panel which comprises a layer of piezoelectric material arranged between a plurality of first electrodes and at least one second electrode, the apparatus comprising:
  a plurality of first force channels, each first force channel configured to:
    receive piezoelectric signals from one or more first electrodes of the touch panel which correspond to first sensor locations which are spaced apart along a first direction; and
    calculate a first force value corresponding to the received piezoelectric signals; and
  a location processing module configured to receive the plurality of first force values, and to:
    determine whether the plurality of first force values include one or more first candidate peaks, each first candidate peak corresponding to a local maximum of the plurality of first force values; and
    in response to at least one first candidate peak exceeding a minimum force threshold:
      interpolate the plurality of first force values;
      estimate a number of first peak coordinates and corresponding first peak force values based on the interpolated first force values and the first candidate peaks which exceed the minimum force threshold;
    and, for each peak coordinate:
      in response to the peak coordinate being associated with a tracked touch event:
        add the peak coordinate to a coordinate buffer which stores a number of previously estimated peak coordinates for the tracked touch event;
        calculate an average coordinate based on the coordinate buffer; and
        output the average coordinate and the peak force value;

or,
in response to the peak coordinate not being associated with any tracked touch event:
store the peak coordinate and the corresponding peak force value to a new tracked touch event; and
output the peak coordinate and the corresponding peak force value.

14. Apparatus according to claim 13, further comprising:
a plurality of second force channels, each second force channel configured to:
receive piezoelectric signals from one or more first electrodes of the touch panel which correspond to second sensor locations which are spaced apart along a second direction which is different from the first direction; and
calculate a second force value corresponding to the received piezoelectric signals;
wherein the location processing module is further configured to receive the plurality of second force values, and to:
calculate a plurality of second force values corresponding to piezoelectric signals which correspond to first electrodes at second sensor locations which are spaced apart along a second direction which is different to the first direction;
determine whether the plurality of second force values include one or more second candidate peaks, each second candidate peak corresponding to a local maximum of the plurality of second force values; and,
in response to at least one second candidate peak exceeding a minimum force threshold:
interpolate the plurality of second force values; and,
estimate a number of second peak coordinates and corresponding second peak force values based on the interpolated second force values and the second candidate peaks which exceed the minimum force threshold;
wherein the location processing module is further configured to match first peak coordinates with second peak coordinates to obtain two-dimensional coordinates.

15. A system comprising:
the apparatus according to claim 13; and
a touch panel which comprises a layer of piezoelectric material arranged between a plurality of first electrodes and at least one second electrode.

* * * * *